US008666614B2

(12) United States Patent
Nakamura et al.

(10) Patent No.: US 8,666,614 B2
(45) Date of Patent: Mar. 4, 2014

(54) TWIN-CLUTCH TYPE HYBRID TRANSMISSION

(75) Inventors: Hideki Nakamura, Saitama (JP); Masahiko Ibamoto, Saitama (JP); Tatsuro Abe, Saitama (JP)

(73) Assignee: Hitachi Nico Transmission Co., Ltd., Saitama-shi (JP)

( * ) Notice: Subject to any disclaimer, the term of this patent is extended or adjusted under 35 U.S.C. 154(b) by 146 days.

(21) Appl. No.: 13/392,968

(22) PCT Filed: Jul. 7, 2010

(86) PCT No.: PCT/JP2010/061564
§ 371 (c)(1),
(2), (4) Date: Apr. 26, 2012

(87) PCT Pub. No.: WO2011/027616
PCT Pub. Date: Mar. 10, 2011

(65) Prior Publication Data
US 2012/0203412 A1   Aug. 9, 2012

(30) Foreign Application Priority Data
Sep. 1, 2009   (JP) ................................. 2009-201352

(51) Int. Cl.
*F16H 3/093* (2006.01)
*F16H 3/72* (2006.01)

(52) U.S. Cl.
USPC .................. 701/51; 701/68; 477/79; 477/83; 477/86; 477/90; 477/92; 477/171

(58) Field of Classification Search
USPC .......... 701/36, 51, 67, 68; 477/34, 70, 79, 83, 477/86, 90, 92, 166, 170, 171
See application file for complete search history.

(56) References Cited

U.S. PATENT DOCUMENTS 7,607,367 B2 * 10/2009 Mitsubori et al. ............... 74/335
7,677,378 B2 *  3/2010 Shintani ...................... 192/219.5
(Continued)

FOREIGN PATENT DOCUMENTS

JP   012250761 A   4/1989
JP   02103555 U    8/1990
(Continued)

OTHER PUBLICATIONS

Kimura et al., "Twin Clutch SST—Newly Developed Twin Clutch SST (Sport Shift Transmission)", Mitsubishi Motors Technical Review 20:31-34 (2008) (and partial translation).

*Primary Examiner* — Russell Frejd
(74) *Attorney, Agent, or Firm* — Porzio, Bromberg & Newman, P.C.

(57) ABSTRACT

A twin-clutch type hybrid transmission is configured to include an input shaft 10, an odd-numbered stage shift mechanism 30, an even-numbered stage shift mechanism 60, a motor power mechanism 20, and an output mechanism 90. The shift mechanisms 30 and 60 include transmission gear trains 32 and 62, and main clutches 34 and 64, respectively, the main clutches 34 and 64 for selectively transmitting the power of the transmission gear train 32 and the power of the transmission gear train 62 to transmission shafts 40 and 70, respectively. The shift mechanisms 30 and 60 also include shift gear trains 41, 43, 45, 47, 72, 74, 76, and 78 provided to the transmission shafts 40 and 70 to transmit rotation to the output mechanism 90, respectively, and mechanical clutches 50, 52, 80, and 82 for selectively engaging the corresponding shift gear trains and the transmission shafts 40 and 70, respectively. As a result, a compact twin-clutch type hybrid transmission having high transmission efficiency can be obtained.

24 Claims, 28 Drawing Sheets

(56) References Cited

U.S. PATENT DOCUMENTS

| | | | |
|---|---|---|---|
| 7,694,792 B2* | 4/2010 | Tsukada et al. | 192/48.91 |
| 7,762,154 B2* | 7/2010 | Murakami et al. | 74/331 |
| 8,127,635 B2* | 3/2012 | Tsukada et al. | 74/331 |
| 8,170,760 B2* | 5/2012 | Sato et al. | 701/54 |
| 8,216,110 B2* | 7/2012 | Katakura et al. | 477/79 |
| 8,307,729 B2* | 11/2012 | Chazotte | 74/331 |
| 8,366,585 B2* | 2/2013 | Terwart et al. | 477/80 |
| 2003/0178278 A1 | 9/2003 | Shigyo | |
| 2006/0016285 A1* | 1/2006 | Ogami et al. | 74/473.1 |
| 2006/0219033 A1* | 10/2006 | Gitt | 74/330 |
| 2008/0087119 A1* | 4/2008 | Shiozaki | 74/330 |

FOREIGN PATENT DOCUMENTS

| | | |
|---|---|---|
| JP | 2565596 Y | 5/1993 |
| JP | 2002204504 A | 7/2002 |
| JP | 2003269592 A | 9/2003 |
| JP | 2005088847 A | 7/2005 |

* cited by examiner

TWIN-CLUTCH TYPE HYBRID TRANSMISSION

This is a National Stage of International Application No. PCT/JP2010/061564, filed Jul. 7, 2010, which claims the benefit of Application No. JP2009-201352, filed in Japan on Sep. 1, 2009, the disclosures of which Applications are incorporated by reference herein.

TECHNICAL FIELD

The present invention relates to a twin-clutch type transmission that performs control of gear shift by using two or more clutches in combination, and more specifically, to a hybrid technique using a motor in combination.

BACKGROUND ART

Conventionally used transmissions for diesel railcars (diesel motor unit) include a torque converter for transmitting the power of an engine, multi-stage shift gears connected to the torque converter, and a wet type multiple disc clutch for switching the shift gears (see the publication of Registered Japanese Utility Model Application 2565596). A technique employed in transmissions for diesel railcars for enhancing transmission efficiency by using a mechanical clutch in place of the wet type multiple disc clutch is also suggested (see the publication of Japanese Utility Model Application Laid-Open No. Hei. 2-103555, and the publication of Japanese Patent Application Laid-Open No. Hei. 1-220761).

A twin-clutch type transmission for use in automobiles has been put into practical use in recent years (see publication of Japanese Patent Application Laid-Open No. 2003-269592, and Mitsubishi Motors Technical Review 2008 No. 20, pp. 31-34). Such a twin-clutch type transmission has already been used as a transmission for racing cars.

According to a hybrid technique suggested in recent years for transmissions for automobiles, a motor is provided in addition to an engine for assisting power with the motor during start or acceleration, and to generate electricity with the motor during deceleration.

SUMMARY OF INVENTION

Technical Problem

Transmissions for large dump trucks or diesel railcars obtain pulling power in a low vehicle speed range by using power transmission through a torque converter in consideration of the output characteristics of an engine. However, the torque converter generally results in low transmission efficiency as the power is transmitted through a fluid. Accordingly, these transmissions suffer from further reduction of transmission efficiency as a result of longer time of operation with the torque converter.

Regarding the twin-clutch type transmissions disclosed in the publication of Japanese Patent Application Laid-Open No. 2003-269592 and Mitsubishi Motors Technical Review 2008 No. 20, pp. 31-34, these twin-clutch type transmissions are particularly likely to increase their overall lengths by the length of a clutch. If these twin-clutch type transmissions are used in a large dump truck, for example, a high-capacity torque converter should be disposed in a former stage, resulting in a problem of further increase of the lengths of the transmissions.

These twin-clutch type transmissions require a synchronization clutch in each stage in order to provide synchronization during upshift or downshift. If a wet type multiple disc clutch is used as a synchronization clutch, and if the number of shift stages is increased to enhance the transmission efficiency of the transmissions, the number of wet type multiple disc clutches placed in corresponding stages is increased. A disengaged wet type multiple disc clutch (not involved in power transmission) idles, generating a problem of idling loss. In particular, if the aforementioned twin-clutch type transmissions are used for large dump trucks or diesel railcars, the capacity of a wet type multiple disc clutch should be increased, resulting in a problem of further increase of idling loss.

Such idling loss generated by a wet type multiple disc clutch may be prevented by using a mechanical clutch such as that disclosed in the publication of Utility Model Application Laid-Open No. 2-103555 or publication of Japanese Patent Application Laid-Open No. 1-220761 listed above. This however results in a problem of complication of a synchronizing control system of clutches. The structure of a transmission for automobiles generally includes a synchromesh, and accordingly, such a transmission cannot be used directly in transmitting high power, high torque and high inertia required in large dump trucks and others.

The present invention has been made in view of the aforementioned problems. It is an object of the invention to provide a more compact twin-clutch type transmission having higher efficiency by combining a motor with the twin-clutch type transmission.

Solution to Problem

The present invention to achieve the aforementioned object is a twin-clutch type hybrid transmission characterized by including: an input shaft to receive the power of an engine; an odd-numbered stage shift mechanism to which the rotation of the input shaft is transmitted; an even-numbered stage shift mechanism to which the rotation of the input shaft is transmitted; a motor power mechanism for applying the power of a motor to at least one of the odd-numbered stage shift mechanism and the even-numbered stage shift mechanism; and an output mechanism to which the power of the odd-numbered stage shift mechanism and the power of the even-numbered stage shift mechanism are transmitted, and characterized in that the odd-numbered stage shift mechanism includes: an odd-numbered stage transmission gear train for transmitting the rotation of the input shaft; an odd-numbered stage main clutch for selectively transmitting the power of the odd-numbered stage transmission gear train to an odd-numbered stage transmission shaft; an odd-numbered stage shift gear train provided to the odd-numbered stage transmission shaft, for transmitting rotation to the output mechanism; and an odd-numbered stage mechanical clutch for selectively engaging the odd-numbered stage shift gear train and the odd-numbered stage transmission shaft, and in that the even-numbered stage shift mechanism includes: an even-numbered stage transmission gear train for transmitting the rotation of the input shaft; an even-numbered stage main clutch for selectively transmitting the power of the even-numbered stage transmission gear train to an even-numbered stage transmission shaft; an even-numbered stage shift gear train provided to the even-numbered stage transmission shaft, for transmitting rotation to the output mechanism; and an even-numbered stage mechanical clutch for selectively engaging the even-numbered stage shift gear train and the even-numbered stage transmission shaft.

In the aforementioned invention, the twin-clutch type hybrid transmission to achieve the aforementioned object is characterized in that the motor power mechanism includes an odd-numbered stage motor for transmitting power to the odd-numbered stage transmission shaft, and an even-numbered stage motor for transmitting power to the even-numbered stage transmission shaft.

In the aforementioned invention, the twin-clutch type hybrid transmission to achieve the aforementioned object is characterized in that the odd-numbered stage motor controls the rotation of the odd-numbered stage transmission shaft to provide synchronization with the odd-numbered stage mechanical clutch, and the even-numbered stage motor controls the rotation of the even-numbered stage transmission shaft to provide synchronization with the even-numbered stage mechanical clutch.

In the aforementioned invention, the twin-clutch type hybrid transmission to achieve the aforementioned object is characterized in that the odd-numbered stage motor and the even-numbered stage motor have different capacities.

In the aforementioned invention, the twin-clutch type hybrid transmission to achieve the aforementioned object is characterized in that at least one of the odd-numbered stage motor and the even-numbered stage motor having a higher capacity selectively transmits power to the odd-numbered stage transmission shaft or the even-numbered stage transmission shaft through a motor clutch.

In the aforementioned invention, the twin-clutch type hybrid transmission to achieve the aforementioned object is characterized in that start is made by transmitting the power of at least one of the odd-numbered stage motor and the even-numbered stage motor having a higher capacity to the output shaft.

In the aforementioned invention, the twin-clutch type hybrid transmission to achieve the aforementioned object is characterized in that a regenerative brake is activated by at least one of the odd-numbered stage motor and the even-numbered stage motor having a higher capacity.

In the aforementioned invention, the twin-clutch type hybrid transmission to achieve the aforementioned object is characterized in that the power of the engine is regenerated by at least one of the odd-numbered stage motor and the even-numbered stage motor having a higher capacity.

In the aforementioned invention, the twin-clutch type hybrid transmission to achieve the aforementioned object is characterized by further including a transmission control unit for controlling transmission of the odd-numbered stage shift mechanism and the even-numbered stage shift mechanism, and characterized in that the transmission control unit includes: an output-side rotation sensor capable of directly or indirectly detecting the numbers of rotations of the odd-numbered stage shift gear train and the even-numbered stage shift gear train; an odd-numbered stage synchronization controller for controlling the odd-numbered stage motor such that the number of rotations of the odd-numbered stage shift gear train and the rotation of the odd-numbered stage transmission shaft are in synchronization with each other; and an even-numbered stage synchronization controller for controlling the even-numbered stage motor such that the number of rotations of the even-numbered stage shift gear train and the rotation of the even-numbered stage transmission shaft are in synchronization with each other.

In the aforementioned invention, the twin-clutch type hybrid transmission to achieve the aforementioned object is characterized in that the transmission control unit includes a start controller for engaging both the odd-numbered stage mechanical clutch and the even-numbered stage mechanical clutch for start, and causing the odd-numbered stage motor and the even-numbered stage motor to rotate at the same time to transmit both the power of the odd-numbered stage motor and the power of the even-numbered stage motor to the output shaft.

In the aforementioned invention, the twin-clutch type hybrid transmission to achieve the aforementioned object is characterized in that the transmission control unit includes an input-side rotation sensor capable of directly or indirectly detecting the number of rotations of the input shaft, and a switching controller for determining a driving condition made by the engine, and stopping drive by the odd-numbered stage motor and the even-numbered stage motor.

In the aforementioned invention, the twin-clutch type hybrid transmission to achieve the aforementioned object is characterized in that the transmission control unit includes a deceleration controller for engaging both the odd-numbered stage mechanical clutch and the even-numbered stage mechanical clutch, and transmitting the rotation of the output shaft to both the odd-numbered stage motor and the even-numbered stage motor, thereby activating a regenerating brake with the odd-numbered stage motor and the even-numbered stage motor.

In the aforementioned invention, the twin-clutch type hybrid transmission to achieve the aforementioned object is characterized in that the transmission control unit includes an assist controller for assisting drive during acceleration with the engine by causing at least one of the odd-numbered stage motor and the even-numbered stage motor to rotate.

In the aforementioned invention, the twin-clutch type hybrid transmission to achieve the aforementioned object is characterized in that the transmission control unit includes a regeneration controller for regenerating redundant energy with the even-numbered stage motor and the odd-numbered stage motor in the even-numbered stage shift mechanism during drive with the engine through the odd-numbered stage shift mechanism, and for regenerating redundant energy with the odd-numbered stage motor and the even-numbered stage motor in the odd-numbered stage shift mechanism during drive with the engine through the even-numbered stage shift mechanism.

In the aforementioned invention, the twin-clutch type hybrid transmission to achieve the aforementioned object is characterized by including an emergency start controller for, if the remaining capacity of a battery is at a reference value or lower at the time of start, engaging either the odd-numbered stage mechanical clutch or the even-numbered stage mechanical clutch and driving an engaged one of the odd-numbered stage motor and the even-numbered stage motor to transmit power to the output shaft, and transmitting the power of the engine to a disengaged one of the odd-numbered stage motor and the even-numbered stage motor to charge the battery.

In the aforementioned invention, the twin-clutch type hybrid transmission to achieve the aforementioned object is characterized by including an external transmission gear train for transmitting the power of the motors of the motor power mechanism, and an actuator for external work connected to the external transmission gear train.

In the aforementioned invention, the twin-clutch type hybrid transmission to achieve the aforementioned object is characterized in that the motor power mechanism includes a common synchronization motor, an odd-numbered stage motor clutch for selectively engaging the common synchronization motor and the odd-numbered stage transmission shaft, and an even-numbered stage motor clutch for selectively engaging the common synchronization motor and the even-numbered stage transmission shaft.

In the aforementioned invention, the twin-clutch type hybrid transmission to achieve the aforementioned object is characterized in that start is made by transmitting the power of the common synchronization motor to the output shaft.

In the aforementioned invention, the twin-clutch type hybrid transmission to achieve the aforementioned object is characterized in that the common synchronization motor activates a regenerative brake.

In the aforementioned invention, the twin-clutch type hybrid transmission to achieve the aforementioned object is characterized in that the common synchronization motor regenerates the power of the engine.

In the aforementioned invention, the twin-clutch type hybrid transmission to achieve the aforementioned object is characterized in that the common synchronization motor is caused to rotate during acceleration with the engine to assist drive.

In the aforementioned invention, the twin-clutch type hybrid transmission to achieve the aforementioned object is characterized in that an interstage ratio between adjacent speed stages is set at a substantially constant value.

In the aforementioned invention, the twin-clutch type hybrid transmission to achieve the aforementioned object is characterized in that the gear ratios of the odd-numbered stage transmission gear train and the even-numbered stage transmission gear train are determined such that the ratio of rotation of the even-numbered stage transmission shaft to the rotation of the odd-numbered stage transmission shaft is substantially the same as the interstage ratio.

In the aforementioned invention, the twin-clutch type hybrid transmission to achieve the aforementioned object is characterized in that the odd-numbered stage shift gear train and the even-numbered stage shift gear train have substantially the same gear ratio at least between some adjacent ones of shift stages, and that the odd-numbered stage shift gear train and the even-numbered stage shift gear train share a gear of the output mechanism.

In the aforementioned invention, the twin-clutch type hybrid transmission to achieve the aforementioned object is characterized by further including a synchronization shift mechanism for mechanically providing synchronization between the odd-numbered stage shift mechanism and even-numbered stage shift mechanism during gear shift, and characterized in that the synchronization shift mechanism includes: a first synchronization gear train for engaging the odd-numbered stage transmission shaft and the even-numbered stage transmission shaft such that the odd-numbered stage transmission shaft and the even-numbered stage transmission shaft rotate at a first ratio of rotation; a first synchronization clutch for selecting engagement made by the first synchronization gear train; a second synchronization gear train for engaging the odd-numbered stage transmission shaft and the even-numbered stage transmission shaft such that the odd-numbered stage transmission shaft and the even-numbered stage transmission shaft rotate at a second ratio of rotation; and a second synchronization clutch for selecting engagement made by the second synchronization gear train, and in that the odd-numbered stage shift mechanism and the even-numbered stage shift mechanism come into synchronization with each other while the first synchronization gear train and the second synchronization gear train are selectively engaged, thereby realizing shift-up or shift-down.

Advantageous Effects of Invention

According to the present invention, an excellent effect can be achieved as the invention can provide a highly efficient twin-clutch type hybrid transmission having a compact and simple structure and capable of making prompt gear shift.

DESCRIPTION OF EMBODIMENTS

Figure 1:
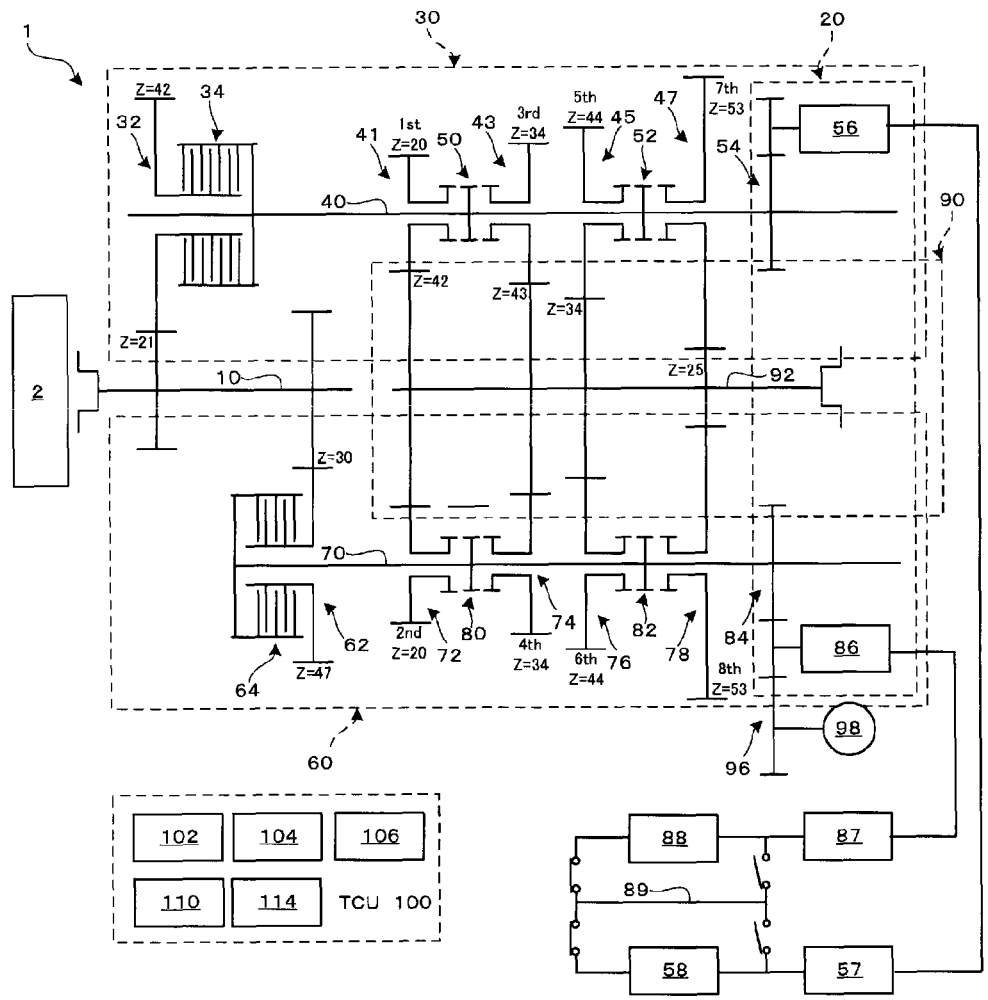
FIG. 1 is a skeleton diagram showing the overall structure of a twin-clutch type hybrid transmission of a first embodiment of the present invention.

A twin-clutch type hybrid transmission (hereinafter called a transmission) of embodiments of the present invention will be described below by referring to the drawings. The transmission is used preferably in a large dump truck and others.

[First Embodiment]

FIG. 1 shows the structure of a transmission 1 of a first embodiment of the present invention. The transmission 1 includes: an input shaft 10 to receive the power of a diesel engine 2; an odd-numbered stage shift mechanism 30 to which the rotation of the input shaft 10 is transmitted; an even-numbered stage shift mechanism 60 to which the rotation of the input shaft 10 is also transmitted; a motor power mechanism 20 for applying the power of a motor to the odd-numbered stage shift mechanism 30 and the even-numbered stage shift mechanism 60; an output mechanism 90 to which the power of the odd-numbered stage shift mechanism 30 and the power of the even-numbered stage shift mechanism 60 are selectively transmitted; and a transmission control unit (TCU) 100 for controlling gear shift action. The odd-numbered stage shift mechanism 30 is responsible for gear shift between first, third, fifth, and seventh speeds. The even-numbered stage shift mechanism 60 is responsible for gear shift between second, fourth, sixth, and eighth speeds. Accordingly, the transmission 1 can make gear shift between eight stages in total. In the transmission 1, the odd-numbered stage shift mechanism 30 and the even-numbered stage shift mechanism 60 are each provided with a clutch. Accordingly, while power is transmitted in the odd-numbered stage shift mechanism 30, for example, preparations for shift-up or shift-down to an adjacent stage can be made in the even-numbered stage shift mechanism 60. In addition, while power is transmitted in the even-numbered stage shift mechanism 60, preparations for shift-up or shift-down to an adjacent stage can be made in the odd-numbered stage shift mechanism 30.

The odd-numbered stage shift mechanism 30 includes: an odd-numbered stage transmission gear train 32 for transmitting the rotation of the input shaft 10; an odd-numbered stage main clutch 34 for selectively transmitting the power of the odd-numbered stage transmission gear train 32 to an odd-numbered stage transmission shaft 40; first to seventh (first, third, fifth, and seventh) odd-numbered stage shift gear trains 41, 43, 45 and 47 provided to the odd-numbered stage transmission shaft 40, for transmitting rotation in four stages to the output mechanism 90; and odd-numbered stage mechanical clutches 50 and 52 for selectively engaging the first to seventh (first, third, fifth, and seventh) odd-numbered stage shift gear trains 41, 43, 45 and 47 and the odd-numbered stage transmission shaft 40.

The odd-numbered stage transmission gear train 32 is composed of a shift gear pair providing the number of input teeth of 21, the number of output teeth of 42, and a ratio of rotation of 2.000. The odd-numbered stage transmission gear train 32 is provided between the input shaft 10 and the odd-numbered stage main clutch 34. The odd-numbered stage transmission gear train 32 decelerates the rotation of the input shaft 10, and transmits the rotation to the odd-numbered stage main clutch 34. The odd-numbered stage main clutch 34 is a wet type multiple disc clutch, and can selectively transmit the rotation of the input shaft 10 to the odd-numbered stage transmission shaft 40 by using hydraulic pressure.

As a result, the odd-numbered stage shift mechanism 30 selectively transmits the rotation of the input shaft 10 to the odd-numbered stage transmission shaft 40 at a ratio of rotation of 2.000 by using the odd-numbered stage main clutch 34.

The first-speed shift gear train 41 provided to the odd-numbered stage transmission shaft 40 is composed of a shift gear pair with the number of input teeth of 20, the number of output teeth of 42, and a ratio of rotation of 2.100. The first-shift gear train 41 transmits the rotation of the odd-numbered stage transmission shaft 40 to an output shaft 92 of the output mechanism 90. The third-speed shift gear train 43 is composed of a shift gear pair with the number of input teeth of 34, the number of output teeth of 43, and a ratio of rotation of 1.265. The third-speed shift gear train 43 transmits the rotation of the odd-numbered stage transmission shaft 40 to the output shaft 92 of the output mechanism 90. The fifth-speed shift gear train 45 is composed of a shift gear pair with the number of input teeth of 44, the number of output teeth of 43, and a ratio of rotation of 0.773. The fifth-speed shift gear train 45 transmits the rotation of the odd-numbered stage transmission shaft 40 to the output shaft 92 of the output mechanism 90. The seventh-speed shift gear train 47 is composed of a shift gear pair with the number of input teeth of 53, the number of output teeth of 25, and a ratio of rotation of 0.472. The seventh-speed shift gear train 47 transmits the rotation of the odd-numbered stage transmission shaft 40 to the output shaft 92 of the output mechanism 90.

The odd-numbered stage mechanical clutch 50 is placed between the first-speed shift gear train 41 and the third-speed shift gear train 43. The odd-numbered stage mechanical clutch 50 can selectively switch among a "first speed engaged condition" where the first-speed shift gear train 41 and the odd-numbered stage transmission shaft 40 are engaged, a "third speed engaged condition" where the third-speed shift gear train 43 and the odd-numbered stage transmission shaft 40 are engaged, and a "disengaged condition" where both the first-speed and third-speed shift gear trains 41 and 43 are disengaged from the odd-numbered stage transmission shaft 40.

The other odd-numbered stage mechanical clutch 52 is placed between the fifth-speed shift gear train 45 and the seventh-speed shift gear train 47. The odd-numbered stage mechanical clutch 52 can selectively switch among a "fifth speed engaged condition" where the fifth-speed shift gear train 45 and the odd-numbered stage transmission shaft 40 are engaged, a "seventh speed engaged condition" where the seventh-speed shift gear train 47 and the odd-numbered stage transmission shaft 40 are engaged, and a "disengaged condition" where both the fifth-speed and seventh-speed shift gear trains 45 and 47 are disengaged from the odd-numbered stage transmission shaft 40. As a result, selection among the first, third, fifth and seventh speeds, and neutral can be made where appropriate by switching the odd-numbered stage mechanical clutch 50 or 52 appropriately.

The output mechanism 90 includes the output shaft 92. The power of the output shaft 92 is transmitted to wheels through a propeller shaft, a differential gear and the like not specifically shown in the drawings.

The even-numbered stage shift mechanism 60 includes: an even-numbered stage transmission gear train 62 for transmitting the rotation of the input shaft 10; an even-numbered stage main clutch 64 for selectively transmitting the power of the even-numbered stage transmission gear train 62 to an even-numbered stage transmission shaft 70; second to eighth (second, fourth, sixth, and eighth) even-numbered stage shift gear trains 72, 74, 76 and 78 provided to the even-numbered stage transmission shaft 70, for transmitting rotation in four stages to the output mechanism 90; and even-numbered stage mechanical clutches 80 and 82 for selectively engaging the second to eighth (second, fourth, sixth, and eighth) even-numbered stage shift gear trains 72, 74, 76 and 78 and the even-numbered stage transmission shaft 70.

The even-numbered stage transmission gear train 62 is composed of a shift gear pair with the number of input teeth of 30, the number of output teeth of 47, and a ratio of rotation of 1.567.

The even-numbered stage transmission gear train 62 is provided between the input shaft 10 and the even-numbered stage main clutch 64. The even-numbered stage transmission gear train 62 decelerates the rotation of the input shaft 10, and transmits the rotation to the even-numbered stage main clutch 64. The even-numbered stage main clutch 64 is a wet type multiple disc clutch, and can selectively transmit the rotation of the input shaft 10 to the even-numbered stage transmission shaft 70.

In a steady state, the even-numbered stage shift mechanism 60 selectively transmits the rotation of the input shaft 10 to the even-numbered stage transmission shaft 70 at a ratio of rotation of 1.567 by using the even-numbered stage main clutch 64.

The second-speed shift gear train 72 provided to the even-numbered stage transmission shaft 70 is composed of a shift gear pair with the number of input teeth of 20, the number of output teeth of 42, and a ratio of rotation of 2.100. The second-speed shift gear train 72 transmits the rotation of the even-numbered stage transmission shaft 70 to the output shaft 92 of the output mechanism 90. An output gear of this shift gear pair is shared with the shift gear pair of the first-speed shift gear train 41 of the odd-numbered stage shift mechanism 30. In addition, the second-speed shift gear train 72 and the first-speed shift gear train 41 have substantially the same (here, completely the same) ratio of rotation. Here, the shift gears used for the second-speed shift gear train 72 and those used for the first-speed shift gear train 41 are actually completely the same. As a result, in the transmission 1 as a whole, a ratio between a ratio of rotation between input and output of the first-speed and that between input and output of the second-speed agrees with a ratio between the ratio of rotation of the odd-numbered stage transmission gear train 32 and that of the even-numbered stage transmission gear train 62.

The fourth-speed shift gear train 74 is composed of a shift gear pair with the number of input teeth of 34, the number of output teeth of 43, and a ratio of rotation of 1.265. The fourth-speed shift gear train 74 transmits the rotation of the even-numbered stage transmission shaft 70 to the output shaft 92 of the output mechanism 90. An output gear of this shift gear pair is shared with the shift gear pair of the third-speed shift gear train 43 of the odd-numbered stage shift mechanism 30. In addition, the fourth-speed shift gear train 74 and the third-speed shift gear train 43 have substantially the same (here, completely the same) ratio of rotation. Accordingly, in the present embodiment, the shift gears used for the fourth-speed shift gear train 74 and those used for the third-speed shift gear train 43 are completely the same. As a result, in the transmission 1 as a whole, an interstage ratio between a ratio of rotation between input and output of the third-speed and that between input and output of the fourth-speed agrees with a ratio between the ratio of rotation of the odd-numbered stage transmission gear train 32 and that of the even-numbered stage transmission gear train 62.

The sixth-speed shift gear train 76 is composed of a shift gear pair with the number of input teeth of 44, the number of output teeth of 34, and a ratio of rotation of 0.773. The sixth-speed shift gear train 76 transmits the rotation of the even-numbered stage transmission shaft 70 to the output shaft 92 of the output mechanism 90. An output gear of this shift gear pair is shared with the shift gear pair of the fifth-speed shift gear train 45 of the odd-numbered stage shift mechanism 30. In addition, the sixth-speed shift gear train 76 and the fifth-speed shift gear train 45 also have substantially the same (here, completely the same) ratio of rotation. Accordingly, in the present embodiment, the shift gears used for the sixth-speed shift gear train 76 and those used for the fifth-speed shift gear train 45 are completely the same. As a result, in the transmission 1 as a whole, an interstage ratio between a ratio of rotation between input and output of the fifth speed and that between input and output of the sixth speed agrees with a ratio between the ratio of rotation of the odd-numbered stage transmission gear train 32 and that of the even-numbered stage transmission gear train 62.

The eighth-speed shift gear train 78 is composed of a shift gear pair with the number of input teeth of 53, the number of output teeth of 25, and a ratio of rotation of 0.472. The eighth-speed shift gear train 78 transmits the rotation of the even-numbered stage transmission shaft 70 to the output shaft 92 of the output mechanism 90. An output gear of this shift gear pair is shared with the shift gear pair of the seventh-speed shift gear train 47 of the odd-numbered stage shift mechanism 30. In addition, the eighth-speed shift gear train 78 and the seventh-speed shift gear train 47 have substantially the same (here, completely the same) ratio of rotation. Accordingly, in the present embodiment, the shift gears used for the eighth-speed shift gear train 78 and those used for the seventh-speed shift gear train 47 are completely the same. As a result, in the transmission 1 as a whole, an interstage ratio between a ratio of rotation between input and output of the seventh speed and that between input and output of the eighth speed agrees with a ratio between the ratio of rotation of the odd-numbered stage transmission gear train 32 and that of the even-numbered stage transmission gear train 62.

The even-numbered stage mechanical clutch 80 is placed between the second-speed shift gear train 72 and the fourth-speed shift gear train 74. The even-numbered stage mechanical clutch 80 can selectively switch among a "second speed engaged condition" where the second-speed shift gear train 72 and the even-numbered stage transmission shaft 70 are engaged, a "fourth speed engaged condition" where the fourth-speed shift gear train 74 and the even-numbered stage transmission shaft 70 are engaged, and a "disengaged condition" where both the second-speed and fourth-speed shift gear trains 72 and 74 are disengaged from the even-numbered stage transmission shaft 70.

The even-numbered stage mechanical clutch 82 is placed between the sixth-speed shift gear train 76 and the eighth-speed shift gear train 78. The even-numbered stage mechanical clutch 82 can selectively switch among a "sixth speed engaged condition" where the sixth-speed shift gear train 76 and the even-numbered stage transmission shaft 70 are engaged, an "eight speed engaged condition" where the eighth-speed shift gear train 78 and the even-numbered stage transmission shaft 70 are engaged, and a "disengaged condition" where both the sixth-speed and eighth-speed shift gear trains 76 and 78 are disengaged from the even-numbered stage transmission shaft 70. As a result, selection among the second, fourth, sixth and eighth speeds, and neutral can be made where appropriate by switching the even-numbered stage mechanical clutch 80 or 82 appropriately.

The motor power mechanism 20 includes a gear train 54 for an odd-numbered stage motor and provided at an end portion of the odd-numbered stage transmission shaft 40, and an odd-numbered stage motor 56 connected to the gear train 54 for an odd-numbered stage motor. An odd-numbered stage inverter 57 and an odd-numbered stage battery 58 are connected to the odd-numbered stage motor 56. The odd-numbered stage motor 56 causes the odd-numbered stage transmission shaft 40 to rotate through the gear train 54 for an odd-numbered stage motor. This provides synchronization of the rotation of the odd-numbered stage transmission shaft 40 with the rotation of any one of the first to seventh (first, third, fifth, and seventh) odd-numbered stage shift gear trains 41, 43, 45 and 47, thereby engaging the odd-numbered stage mechanical clutch 50 or 52. To be specific, shift-up or shift-down to a target odd-numbered stage is realized. During regeneration, the rotation of the odd-numbered stage transmission shaft 40 is transmitted through the gear train 54 for an odd-numbered stage motor to the odd-numbered stage motor 56.

The motor power mechanism 20 further includes a gear train 84 for an even-numbered stage motor and provided at an end portion of the even-numbered stage transmission shaft 70, and an even-numbered stage motor 86 connected to the gear train 84 for an even-numbered stage motor. An even-numbered stage inverter 87 and an even-numbered stage battery 88 are connected to the even-numbered stage motor 86. The even-numbered stage battery 88 and the odd-numbered stage battery 58 are connected in series in normal times. However, on the assumption of breakdown of either battery, for example, a cutoff path 89 is provided by which the broken battery is disconnected from a power supply circuit involved.

The even-numbered stage motor 86 causes the even-numbered stage transmission shaft 70 to rotate through the gear train 84 for an even-numbered stage motor. This provides synchronization of the rotation of the yen-numbered stage transmission shaft 70 with any one of the second to eighth (second, fourth, sixth, and eighth) even-numbered stage shift gear trains 72, 74, 76 and 78, thereby engaging the even-numbered stage mechanical clutch 80 or 82. To be specific, shift-up or shift-down to a target even-numbered stage is realized. During regeneration, the rotation of the even-numbered stage transmission shaft 70 is transmitted through the gear train 84 for an even-numbered stage motor to the even-numbered stage motor 86.

The even-numbered stage motor 86 of the motor power mechanism 20 is also connected through a gear train 96 for external transmission to an actuator 98 for external work. Here, a working hydraulic pump is used as the actuator 98 for external work. The actuator 98 for external work is driven by the power of the even-numbered stage motor 86. The actuator 98 for external work is used to tilt a loading platform and to put a crane into operation, for example. The actuator 98 for external work is driven with the even-numbered stage motor 86. This allows performance of external work while an engine is stopped, so that the work can be conducted quietly during nighttime hours, for example. Further, the even-numbered stage motor 86 may be driven by a hydraulic motor in order to take a load off a loading platform or a crane. This allows regeneration of potential energy.

Ratios of rotation of the first to eighth speeds obtained in the transmission 1 with the aforementioned structure are shown in the table given below.

TABLE 1

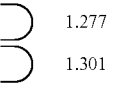

| | | |
|---|---|---|
| FIRST STAGE | $\frac{42}{21} \times \frac{42}{20} =$ | 4.200 |
| SECOND STAGE | $\frac{47}{30} \times \frac{42}{20} =$ | 3.290 |
| THIRD STAGE | $\frac{42}{21} \times \frac{43}{34} =$ | 2.529 |
| FOURTH STAGE | $\frac{47}{30} \times \frac{43}{34} =$ | 1.981 |
| FIFTH STAGE | $\frac{42}{21} \times \frac{34}{44} =$ | 1.545 |
| SIXTH STAGE | $\frac{47}{30} \times \frac{34}{44} =$ | 1.211 |
| SEVENTH STAGE | $\frac{42}{21} \times \frac{25}{53} =$ | 0.943 |
| EIGHTH STAGE | $\frac{47}{30} \times \frac{25}{53} =$ | 0.739 |

Interstage ratios: 1.277, 1.301, 1.277, 1.282, 1.277, 1.283, 1.277

It is thus seen that, in the transmission 1, interstage ratios between adjacent speed stages are set at substantially constant values in a range of from 1.277 to 1.301 (about 1.289). These interstage ratios (about 1.289) are substantially the same as a ratio (1.276=2.000/1.567) between the ratio of rotation of the odd-numbered stage transmission gear train 32 (2.000) and that of the even-numbered stage transmission gear train 62 (1.567).

The gear shift action of the transmission 1 will be described next by giving a description of the transmission control unit 100. It is assumed that the input shaft 10 is caused to rotate at 1000 min$^{-1}$ if the transmission 1 is driven by the diesel engine 2.

Figure 2:
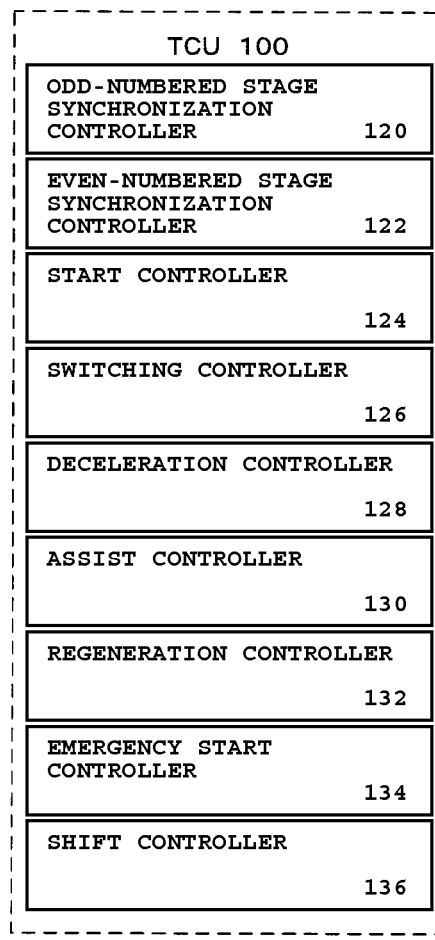
FIG. 2 is a block diagram showing the structure of a control function of the twin-clutch type hybrid transmission of the first embodiment.

The transmission control unit 100 includes various sensors, a CPU, a memory, and a power supply unit not specifically shown in the drawings. The transmission control unit 100 further includes various sensors such as a clutch sensor 102 for detecting the condition of each clutch, an output-side rotation sensor 104 capable of directly or indirectly detecting the numbers of rotations of the first to seventh (first, third, fifth, and seventh) odd-numbered stage shift gear trains 41, 43, 45 and 47 and the number of rotations of the second to eighth (second, fourth, sixth, and eighth) even-numbered stage shift gear trains 72, 74, 76 and 78, and an input-side rotation sensor 106 capable of directly or indirectly detecting the number of rotations of the input shaft 10 (the number of rotations of the engine 2). The transmission control unit 100 also includes a clutch actuator 110 for putting each clutch of the transmission 1 into operation, a motor controller 114 for controlling a motor, and others. The transmission control unit 100 controls the transmission 1 in response to execution of a predetermined program stored in the memory by the CPU. As shown in FIG. 2, the functional structures of the transmission control unit 100 include an odd-numbered stage synchronization controller 120, an even-numbered stage synchronization controller 122, a start controller 124, a switching controller 126, a deceleration controller 128, an assist controller 130, a regeneration controller 132, an emergency start controller 134, and a shift controller 136. Each of the functional structures will be described by referring to FIG. 3 and its subsequent drawings.

<Operation for Start by Start Controller>

Figure 3:
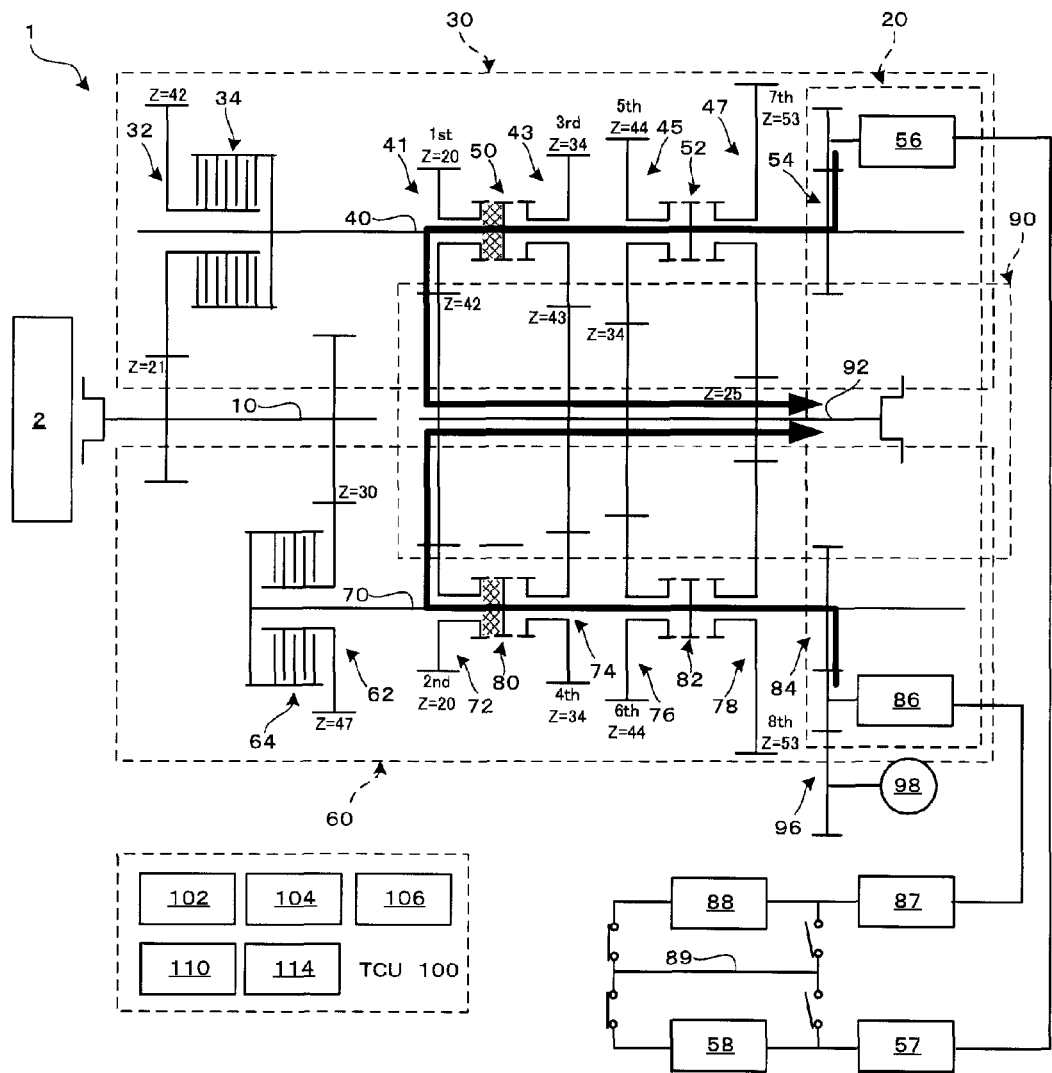
FIG. 3 is a diagram showing the flow of torque generated in the twin-clutch type hybrid transmission of the first embodiment during start.

As shown in FIG. 3, when the transmission 1 is stopped, the start controller 124 engages the odd-numbered stage mechanical clutch 50 to make the "first speed engaged condition," and at the same time, engages the even-numbered stage mechanical clutch 80 to make the "second speed engaged condition." The odd-numbered stage motor 56 and the even-numbered stage motor 86 are thereafter caused to rotate at the same time. As a result, the power of the odd-numbered stage motor 56 and the power of the even-numbered stage motor 86 are both transmitted to the output shaft 92, allowing high-torque drive with the two motors. This eliminates the need for start with the engine 2. Accordingly, provision of a torque converter to the engine 2 becomes unnecessary, or control to engage the odd-numbered stage main clutch 34 gradually while bringing the odd-numbered stage main clutch 34 in a halfway engaged condition to slip becomes unnecessary, thereby allowing prompt start. Backward motion (back) can be made only by reversing the directions of rotations of these motors. This eliminates the need for preparing a mechanical mechanism for backward motion such as a reversing clutch and a reversing gear, allowing simplification of the structure of the transmission.

<Operation by Switching Controller for Switching to Engine>

Figure 4:
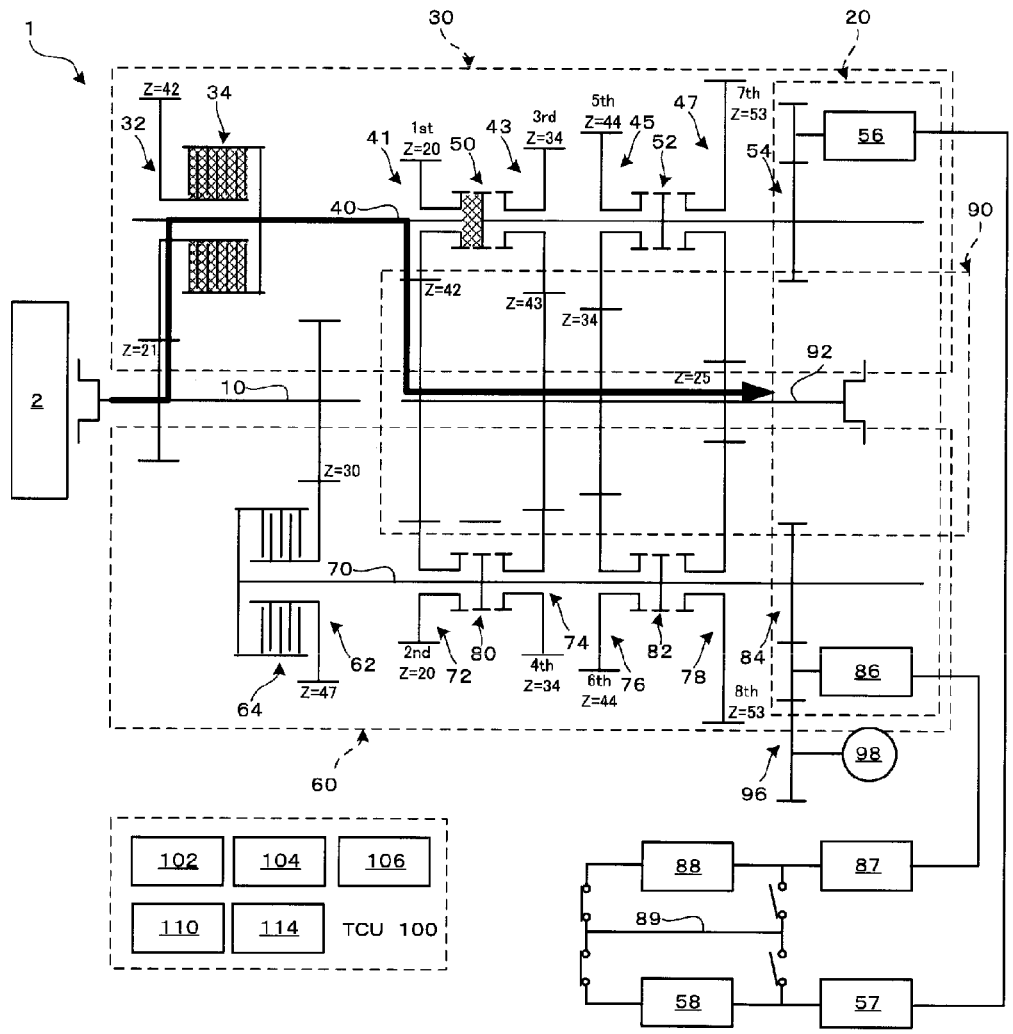
FIG. 4 is a diagram showing the flow of torque generated in the twin-clutch type hybrid transmission of the first embodiment at a first speed.

If the odd-numbered stage transmission shaft 40 reaches a condition where the odd-numbered stage transmission shaft 40 rotates at about 500 min$^{-1}$ (speed allowing the input shaft 10 to rotate at 1000 min$^{-1}$), the switching controller 126 starts the engine 2 as shown in FIG. 4. The engine 2 can be started by letting the engine 2 run from the output side while the odd-numbered stage main clutch 34 is put in a halfway engaged condition, making operation of a starter for the engine 2 unnecessary. After the engine is started, the odd-numbered stage main clutch 34 is engaged gradually while the odd-numbered stage main clutch 34 in a halfway engaged condition is caused to slip. As a result, the power of the engine 2 is transmitted through the input shaft 10 and the odd-numbered stage transmission gear train 32 to the odd-numbered stage transmission shaft 40. This realizes drive with the engine to make shift to operation at the first speed. Thus, the odd-numbered stage transmission shaft is caused to rotate at approximately 500 min$^{-1}$. The rotation of the odd-numbered stage transmission shaft 40 is transmitted through the first-speed shift gear train 41 to the output shaft 92, thereby causing the output shaft 92 to rotate at 238.1 min$^{-1}$. At the same time, drive of the odd-numbered stage motor 56 and the even-numbered stage motor 86 is stopped to release the even-numbered stage mechanical clutch 80, thereby realizing the "disengaged condition."

<Preparations for Second Speed by Even-Numbered Stage Synchronization Controller During Operation at First Speed>

Figure 5:
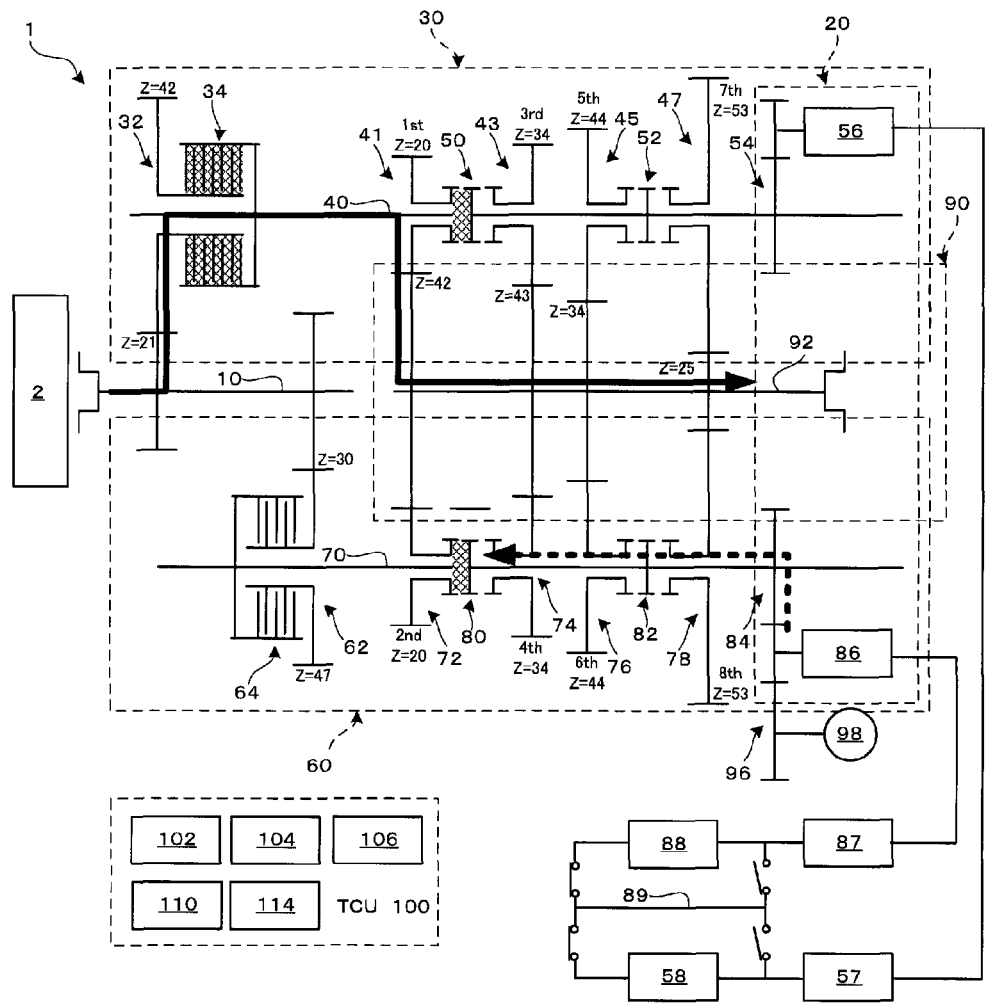
FIG. 5 is a diagram showing the flow of torque generated in the twin-clutch type hybrid transmission of the first embodiment during preparations for a second speed.

During running at the first speed, like the first-speed shift gear train 41, the input gear of the second-speed shift gear train 72 (shift gear closer to the even-numbered stage transmission shaft 70) of the even-numbered stage shift mechanism 60 rotates at about 500 min$^{-1}$. The even-numbered stage synchronization controller 122 drives the even-numbered stage motor 86 to control the rotation of the even-numbered stage transmission shaft 70 at about 500 min$^{-1}$ as shown in FIG. 5. This provides synchronization of the rotation of the even-numbered stage transmission shaft 70 and the rotation of the second-speed shift gear train 72 to engage the even-numbered stage mechanical clutch 80, thereby making the "second speed engaged condition." Accordingly, preparations for shift-up to the second speed are completed, and drive of the even-numbered stage motor 86 is stopped.

<Shift-Up from First Speed to Second Speed by Shift Controller>

Figure 6:
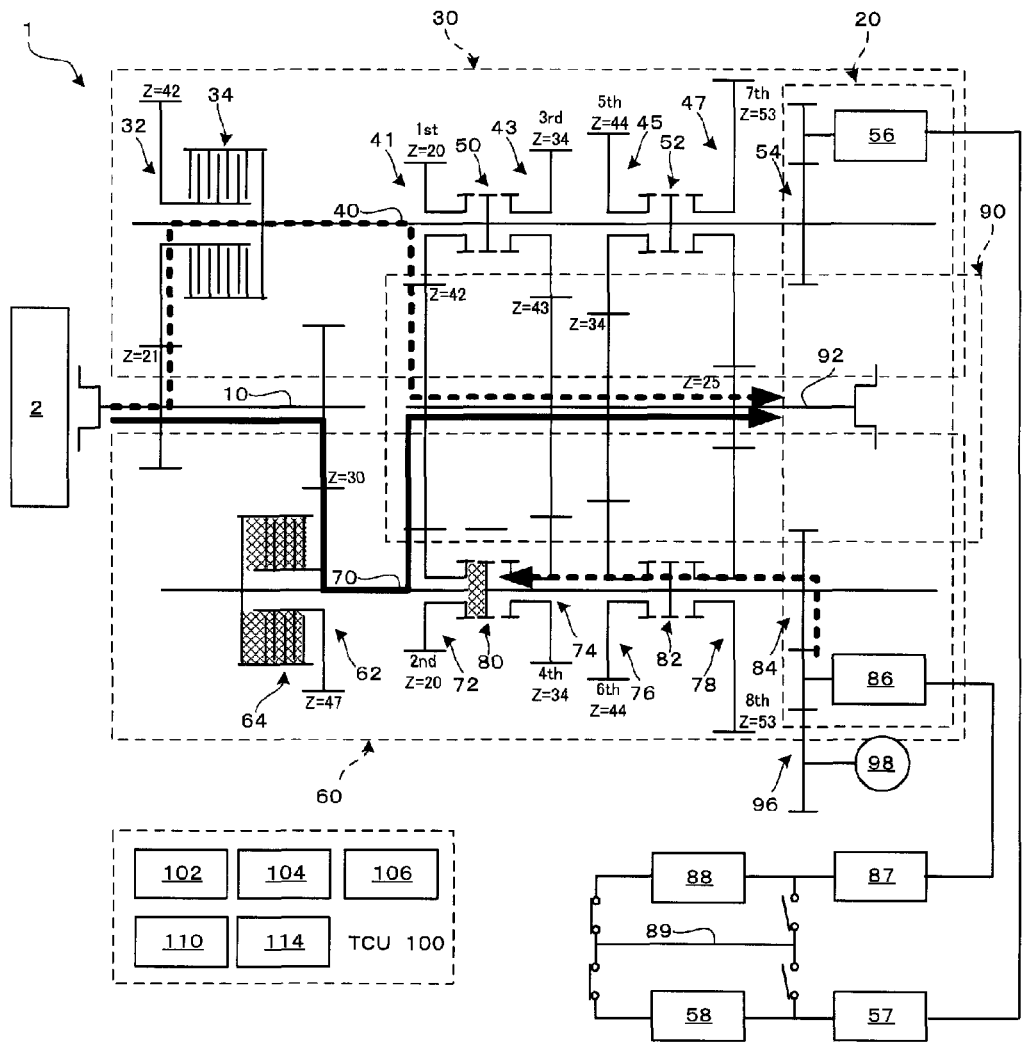
FIG. 6 is a diagram showing the flow of torque generated in the twin-clutch type hybrid transmission of the first embodiment at the second speed.

For shift-up to the second speed, the shift controller 136 engages the even-numbered stage main clutch 64 gradually as shown in FIG. 6. At the same time, the shift controller 136 brings the odd-numbered stage main clutch 34 into the "disengaged condition" to prevent transmission of the rotation of the odd-numbered stage transmission shaft 40 to the output shaft 92. This increases the rotation of the engine to 1000 min$^{-1}$, increases the rotation of the even-numbered stage transmission shaft 70 from 500 min$^{-1}$ to 638 min$^{-1}$, and increases the rotation of the output shaft 92 to 304 min$^{-1}$. As a result, shift-up to the second speed is completed. During the operation at the second speed, the odd-numbered stage mechanical clutch 50 is brought into the "disengaged condition" to make preparations for a next shift.

<Preparations for Third Speed by Odd-Numbered Stage Synchronization Controller During Operation at Second Speed>

Figure 7:
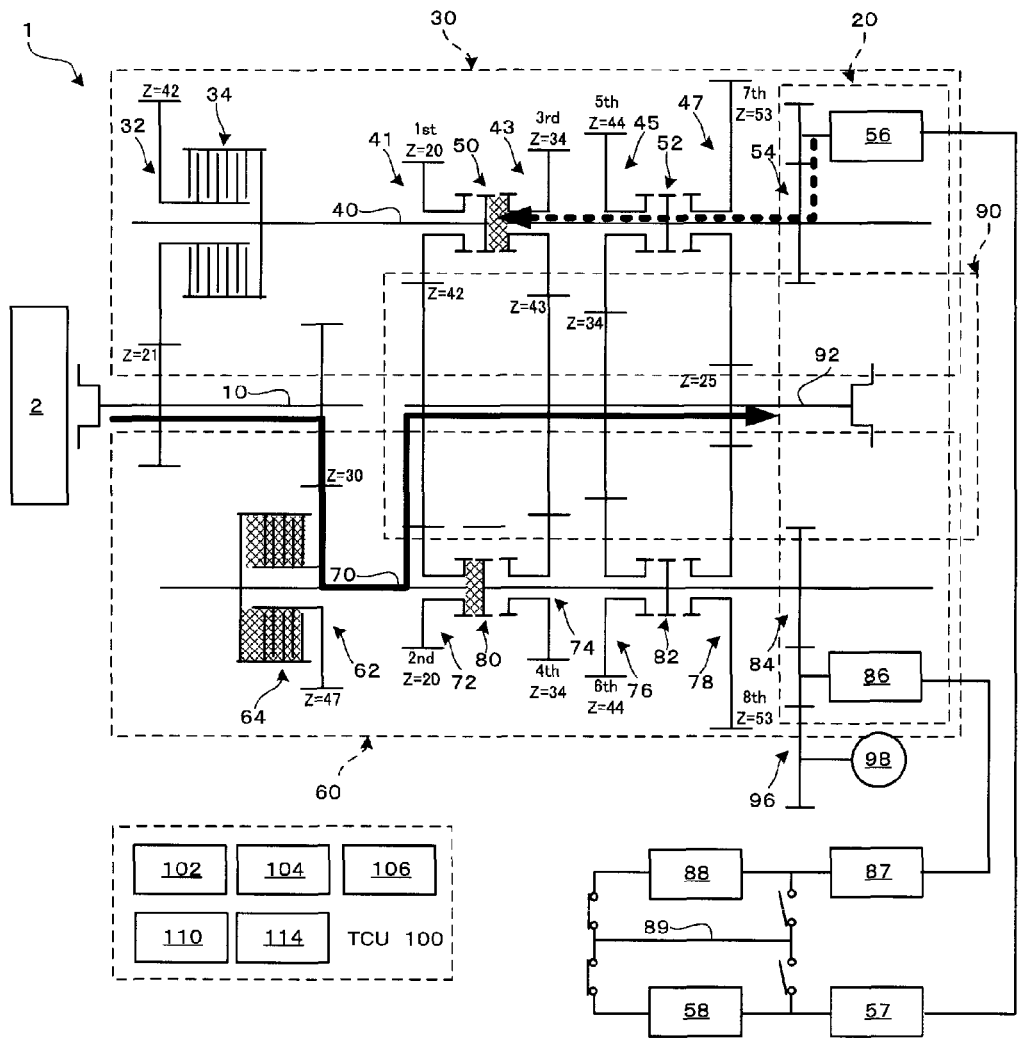
FIG. 7 is a diagram showing the flow of torque generated in the twin-clutch type hybrid transmission of the first embodiment during preparations for a third speed.

During running at the second speed, the input gear of the third-speed shift gear train 43 (shift gear closer to the odd-numbered stage transmission shaft 40) of the odd-numbered stage shift mechanism 30 rotates at about 384 min$^{-1}$ determined by the ratio of rotation thereof. The odd-numbered stage synchronization controller 120 drives the odd-numbered stage motor 56 to control the rotation of the odd-numbered stage transmission shaft 40 at about 384 min$^{-1}$ as shown in FIG. 7. This provides synchronization of the rotation of the odd-numbered stage transmission shaft 40 and the rotation of the third-speed shift gear train 43 to engage the odd-numbered stage mechanical clutch 50, thereby making the "third speed engaged condition." Accordingly, preparations for shift-up to the third speed are completed, and drive of the odd-numbered stage motor 56 is stopped.

<Shift-Up from Second Speed to Third Speed by Shift Controller>

Figure 8:
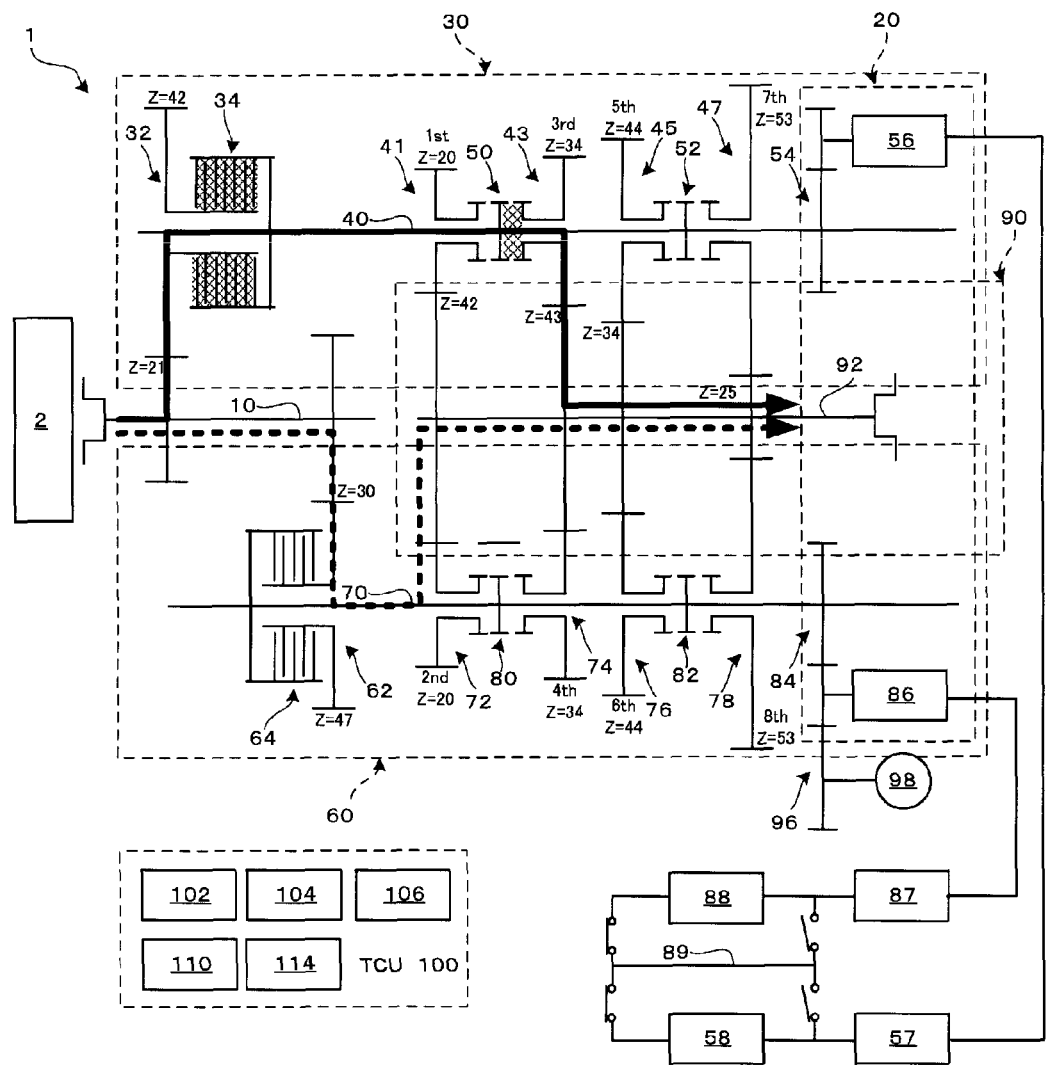
FIG. 8 is a diagram showing the flow of torque generated in the twin-clutch type hybrid transmission of the first embodiment at the third speed.

For shift-up to the third speed, the shift controller 136 engages the odd-numbered stage main clutch 34 gradually as shown in FIG. 8. At the same time, the shift controller 136 brings the even-numbered stage main clutch 64 into the "disengaged condition" to prevent transmission of the rotation of the even-numbered stage transmission shaft 70 to the output shaft 92. This increases the rotation of the engine to 1000 min$^{-1}$, increases the rotation of the odd-numbered stage transmission shaft 40 from 384 min$^{-1}$ to 500 min$^{-1}$, and increases the rotation of the output shaft 92 to 395 min$^{-1}$. As a result, shift-up to the third speed is completed. During the operation at the third speed, the even-numbered stage mechanical clutch 80 is brought into the "disengaged condition" to make preparations for a next shift. Shift-up to the fourth speed and shift-up to its subsequent speeds are performed in the same manner, and they will not be described here.

<Preparations for Second Speed by Even-Numbered Stage Synchronization Controller During Operation at Third Speed>

Figure 9:
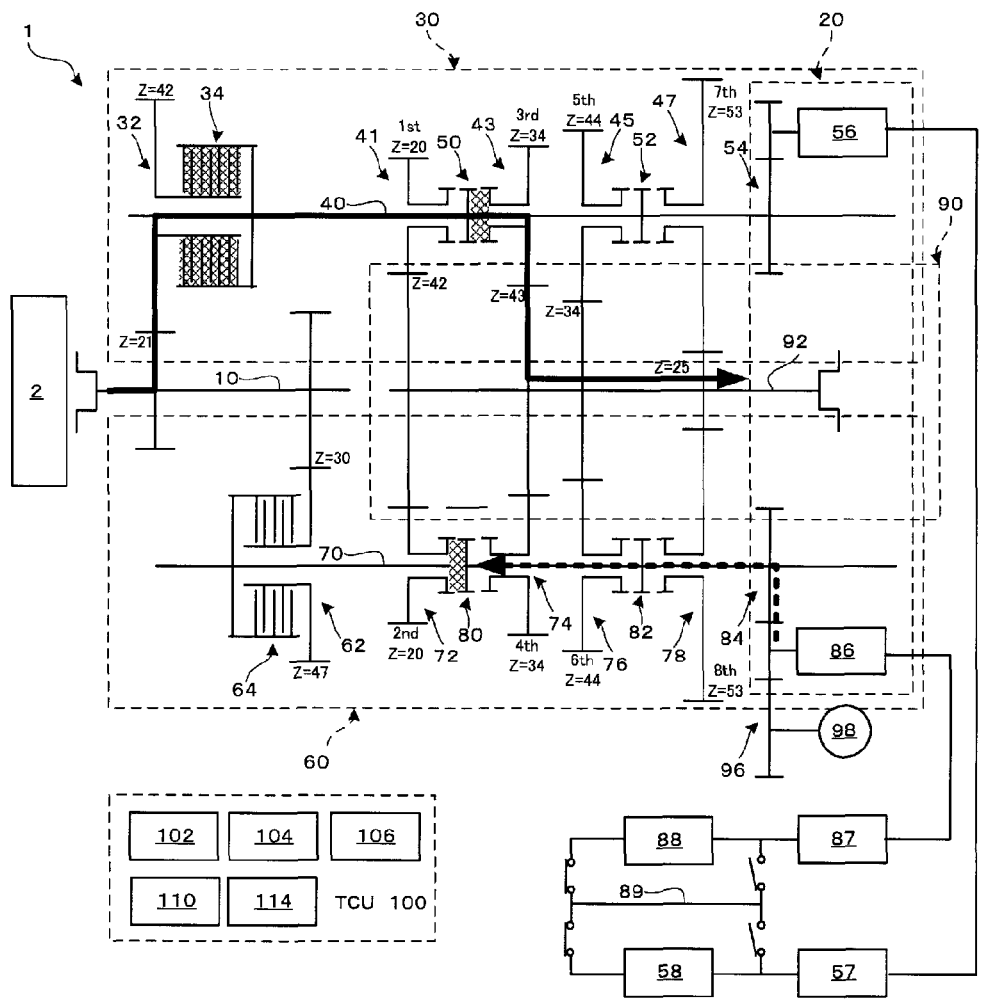
FIG. 9 is a diagram showing the flow of torque generated in the twin-clutch type hybrid transmission of the first embodiment during preparations for the second speed.

In order to make preparations for shift-down from the operation at the third speed to the operation at the second speed, the second-speed shift gear train 72 is engaged with the even-numbered stage transmission shaft 70. More specifically, the output shaft 92 rotates at 395 min$^{-1}$ during the operation at the third speed. Accordingly, the gear of the second-speed shift gear train 72 in the even-numbered stage shift mechanism 60 closer to the even-numbered stage transmission shaft 70 rotates at 830 min$^{-1}$. The even-numbered stage synchronization controller 122 drives the even-numbered stage motor 86 to increase the rotation of the even-numbered stage transmission shaft 70 to 830 min$^{-1}$ as shown in FIG. 9. This substantially provides synchronization of the rotation of the even-numbered stage transmission shaft 70 and the rotation of the second-speed shift gear train 72 to engage the even-numbered stage mechanical clutch 80, thereby making the "second speed engaged condition." Accordingly, preparations for shift-down to the second speed are completed, and drive of the even-numbered stage motor 86 is stopped.

<Shift-Down from Third Speed to Second Speed by Shift Controller>

Figure 10:
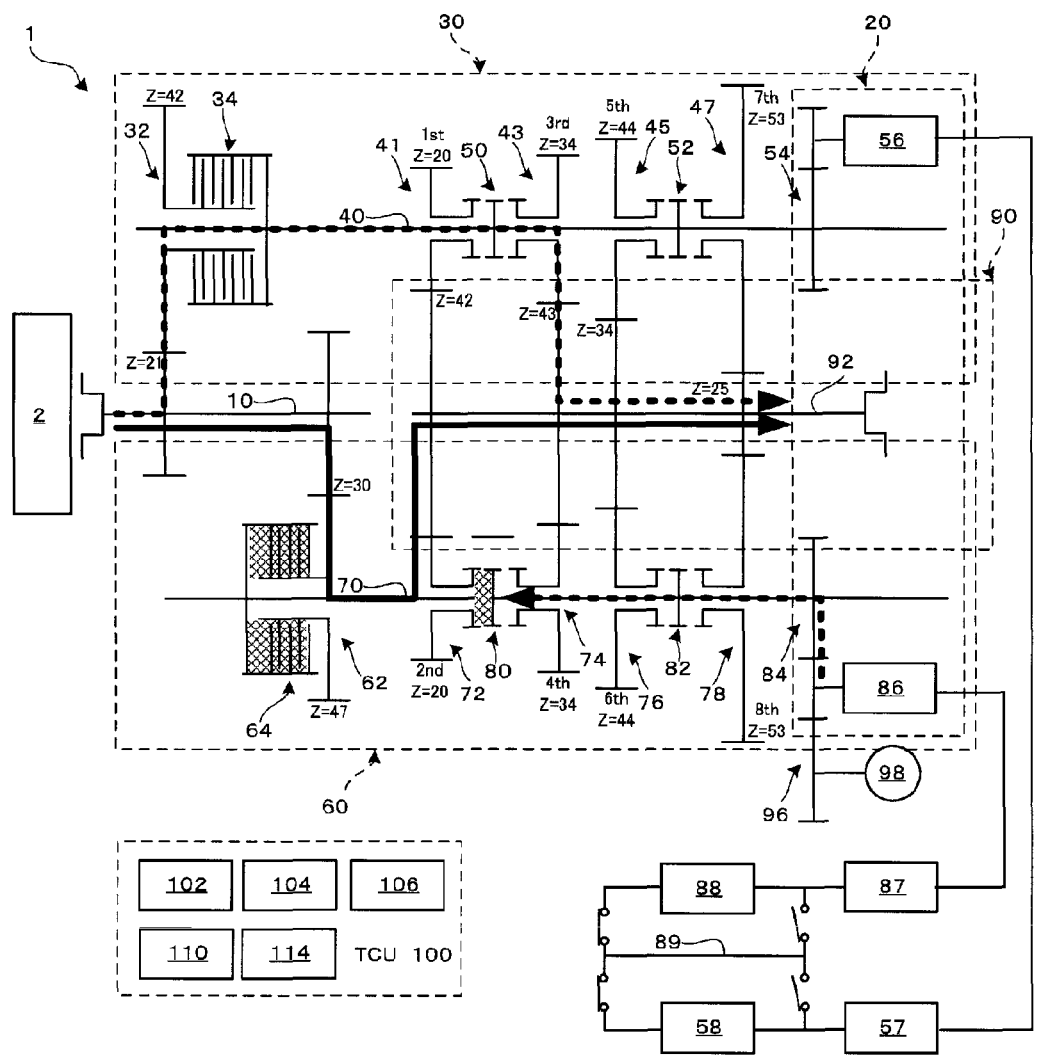
FIG. 10 is a diagram showing the flow of torque generated in the twin-clutch type hybrid transmission of the first embodiment at the second speed.

For shift-down to the second speed, the shift controller 136 engages the even-numbered stage main clutch 64 gradually as shown in FIG. 10. At the same time, the shift controller 136 brings the odd-numbered stage main clutch 34 into the "disengaged condition" to prevent transmission of the rotation of the odd-numbered stage transmission shaft 40 to the output shaft 92. This reduces the rotation of the engine to 1000 min$^{-1}$, reduces the rotation of the even-numbered stage transmission shaft 70 from 830 min$^{-1}$ to 638 min$^{-1}$, and reduces the rotation of the output shaft 92 to 304 min$^{-1}$. As a result, shift-down to the second speed is completed. During the operation at the second speed, the odd-numbered stage mechanical clutch 50 is brought into the "disengaged condition" to make preparations for a next shift.

<Preparations for First Speed by Odd-Numbered Stage Synchronization Controller During Operation at Second Speed>

Figure 11:
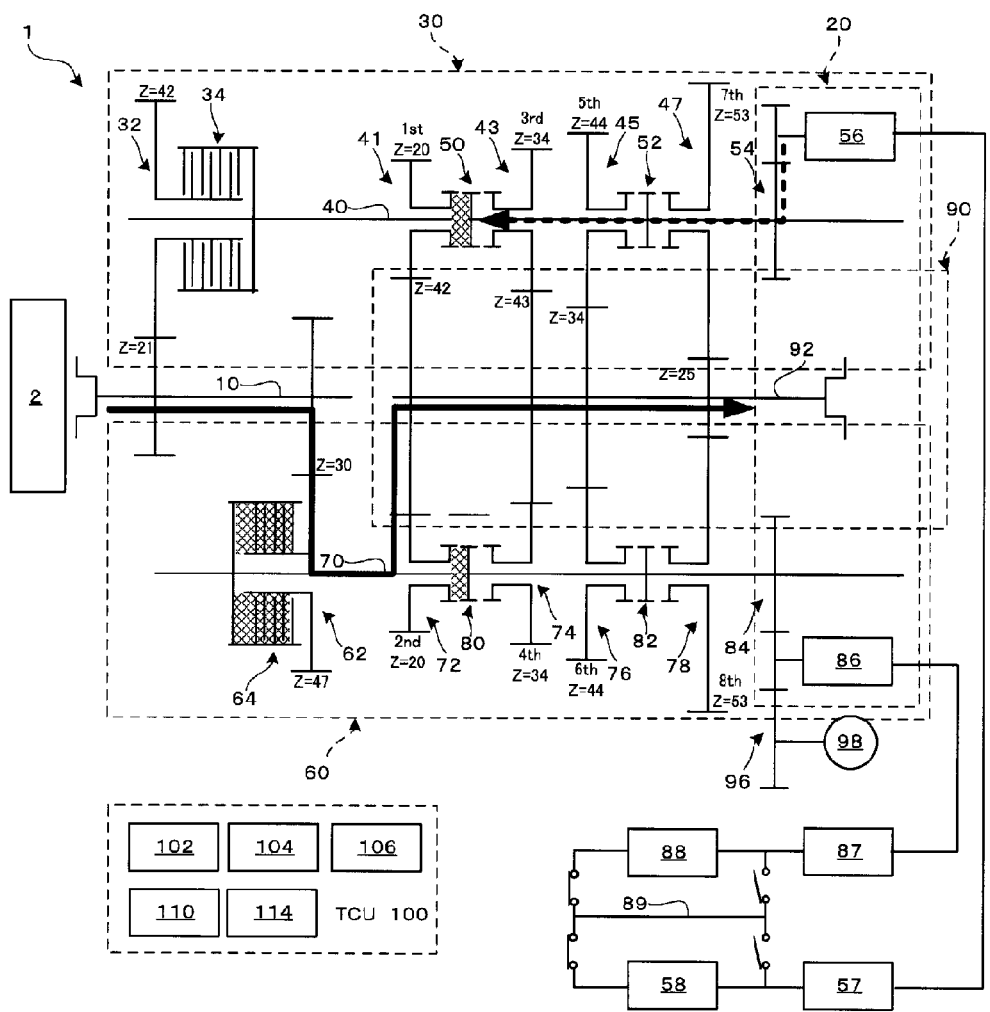
FIG. 11 is a diagram showing the flow of torque generated in the twin-clutch type hybrid transmission of the first embodiment during preparations for the first speed.

In order to make preparations for shift-down from the operation at the second speed to the operation at the first speed, the first-speed shift gear train 41 is engaged with the odd-numbered stage transmission shaft 40. More specifically, the output shaft 92 rotates at 304 min$^{-1}$ during the operation at the second speed. Accordingly, the shift gear of the first-speed shift gear train 41 in the odd-numbered stage shift mechanism 30 closer to the odd-numbered stage transmission shaft 40 rotates at 638 min$^{-1}$. The odd-numbered stage synchronization controller 120 drives the odd-numbered stage motor 56 to increase the rotation of the odd-numbered stage transmission shaft 40 to 638 min$^{-1}$ as shown in FIG. 11. This substantially provides synchronization of the rotation of the odd-numbered stage transmission shaft 40 and the rotation of the first-speed shift gear train 41 to engage the odd-numbered stage mechanical clutch 50, thereby making the "first speed engaged condition."Accordingly, preparations for shift-down to the first speed are completed, and drive of the odd-numbered stage motor 56 is stopped.

<Shift-Down from Second Speed to First Speed by Shift Controller>

Figure 12:
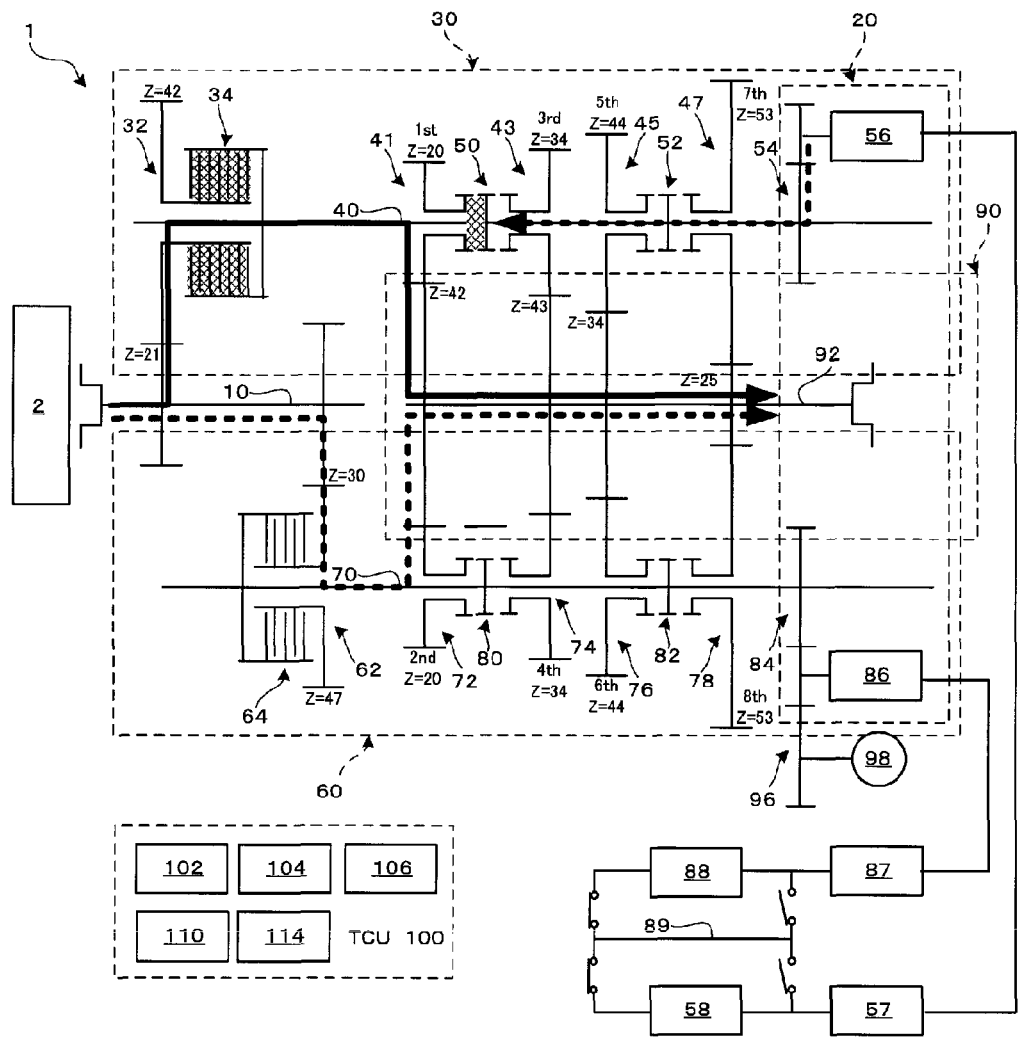
FIG. 12 is a diagram showing the flow of torque generated in the twin-clutch type hybrid transmission of the first embodiment at the first speed.

For shift-down to the first speed, the shift controller 136 engages the odd-numbered stage main clutch 34 gradually as shown in FIG. 12. At the same time, the shift controller 136 brings the even-numbered stage main clutch 64 into the "disengaged condition" to prevent transmission of the rotation of the even-numbered stage transmission shaft 70 to the output shaft 92. This reduces the rotation of the engine to 1000 min$^{-1}$, reduces the rotation of the odd-numbered stage transmission shaft 40 from 638 min$^{-1}$ to 500 min$^{-1}$, and reduces the rotation of the output shaft 92 to 238 min$^{-1}$. As a result, shift-down to the first speed is completed. During the operation at the first speed, the even-numbered stage mechanical clutch 80 is brought into the "disengaged condition" to make preparations for a next shift.

<Regenerative Brake in Deceleration Controller>

Figure 13:
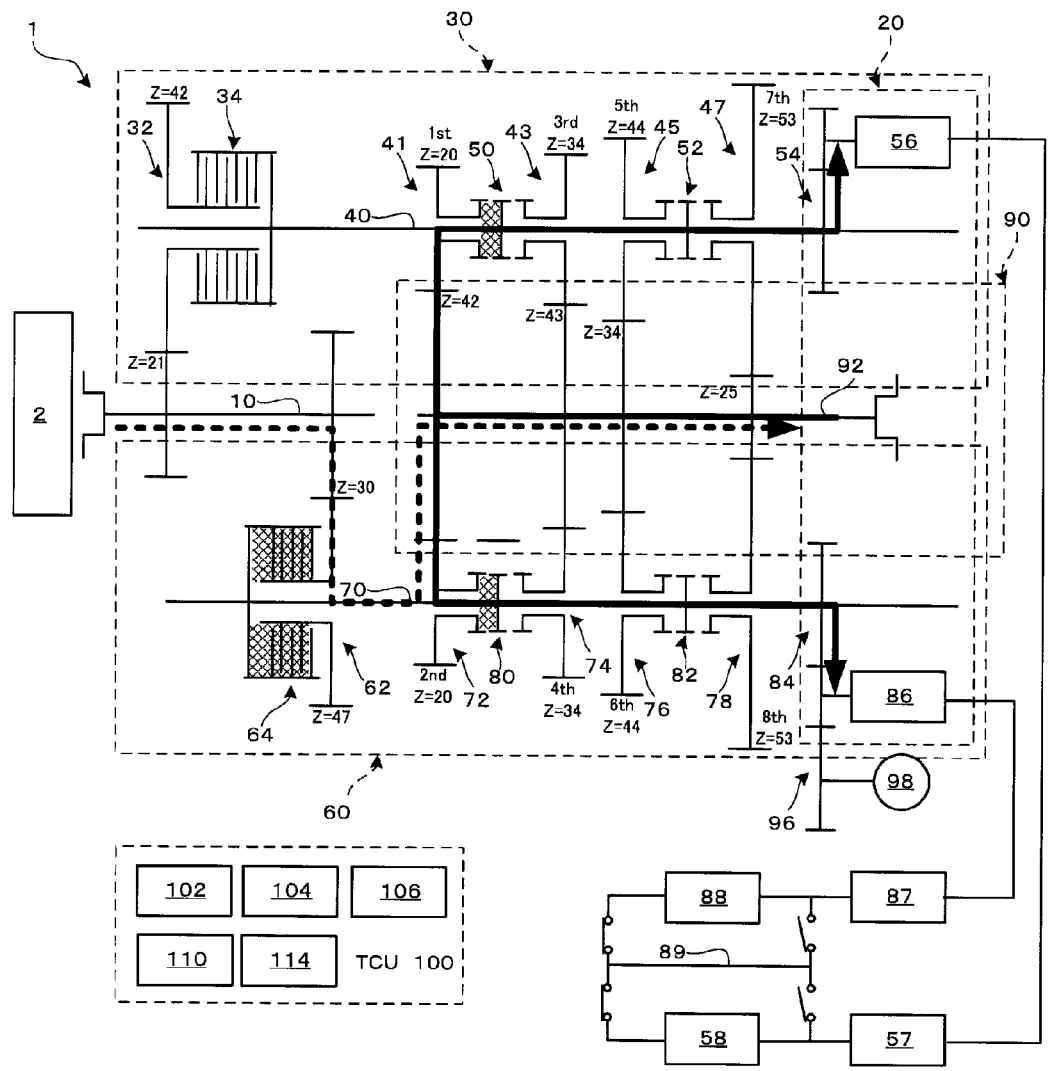
FIG. 13 is a diagram showing the flow of torque generated in the twin-clutch type hybrid transmission of the first embodiment when a regenerative brake is activated.

For deceleration during the operation at the second speed with the engine 2, for example, the deceleration controller 128 makes engagement of any one of the odd-numbered stages by using the odd-numbered stage mechanical clutch 50 or 52 in addition to engagement of the even-numbered stage mechanical clutch 80 as shown in FIG. 13. The number of a stage to be engaged can be selected freely from the first, third, fifth and seventh speeds. However, it is preferable that a stage in a low number (such as the first speed) be engaged in order to enhance the efficiency of a regenerative brake. For engagement of the odd-numbered stage mechanical clutch 50 or 52, the odd-numbered stage synchronization controller 120 temporarily drives the odd-numbered stage motor 56 to provide synchronization. Here, the "first speed engaged condition" is made. While both the odd-numbered stage mechanical clutch 50 and the even-numbered stage mechanical clutch 80 are engaged, the rotation of the output shaft 92 is transmitted to both the odd-numbered stage motor 54 and the even-numbered stage motor 86, thereby activating the regenerative brake with these motors. As a result, the batteries 58 and 88 are charged. Here, the number of rotations of the odd-numbered stage motor 56 is increased to enhance regeneration efficiency by making the first speed engaged condition. Meanwhile, a stage of an optimum number may be selected and then engaged appropriately according to running condition.

<Operation for Acceleration by Assist Controller>

Figure 14:
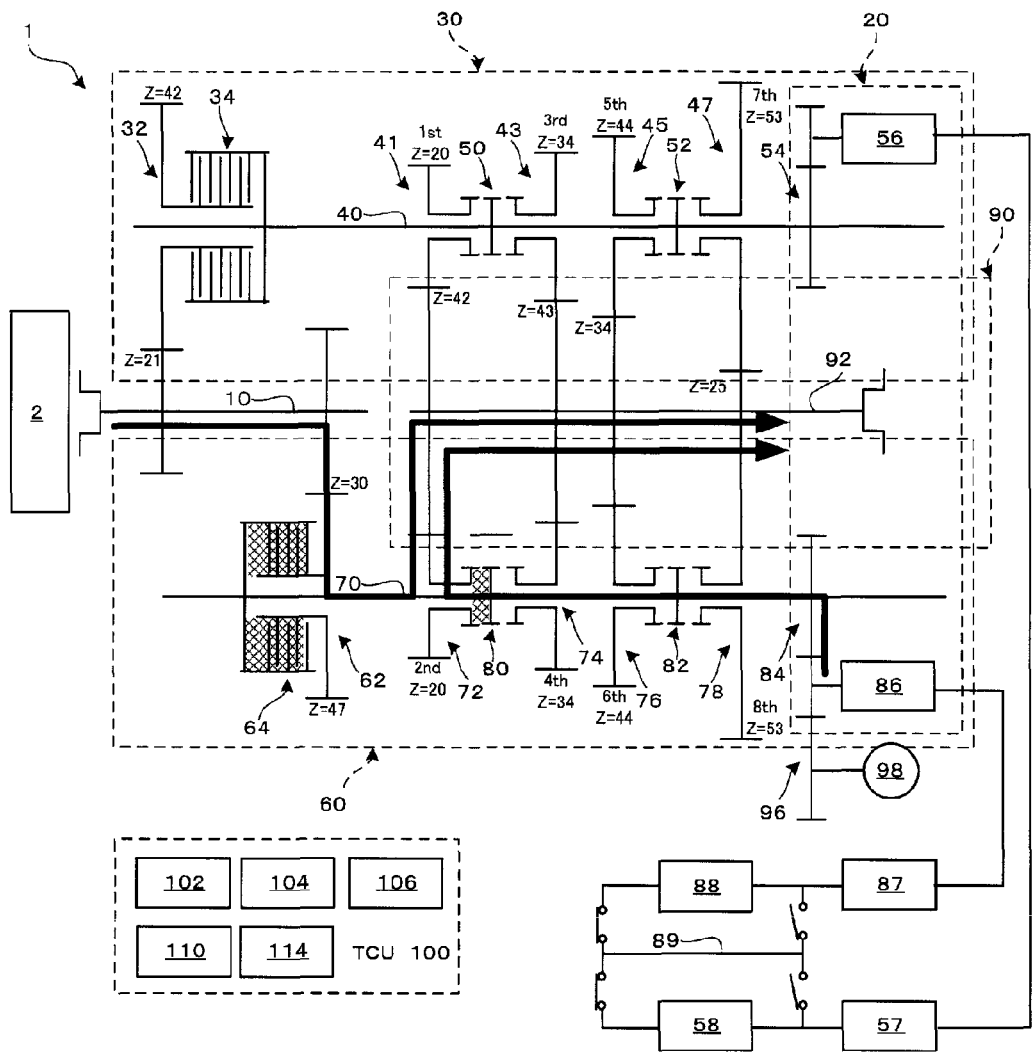
FIG. 14 is a diagram showing the flow of torque generated in the twin-clutch type hybrid transmission of the first embodiment during assist control.

For rapid acceleration during the operation at the second speed with the engine 2, for example, the assist controller 130 drives the even-numbered stage motor 86 to assist power as shown in FIG. 14. This compensates for the torque of the engine 2 to allow rapid acceleration. Although not specifically shown in the drawings, power assist by the odd-numbered stage motor 56 can be added by making engagement of any one of the odd-numbered stages by using the odd-numbered stage mechanical clutch 50 or 52 in addition to engagement of the even-numbered stage mechanical clutch 80.

<Recovery of Redundant Energy by Regeneration Control>

Figure 15:
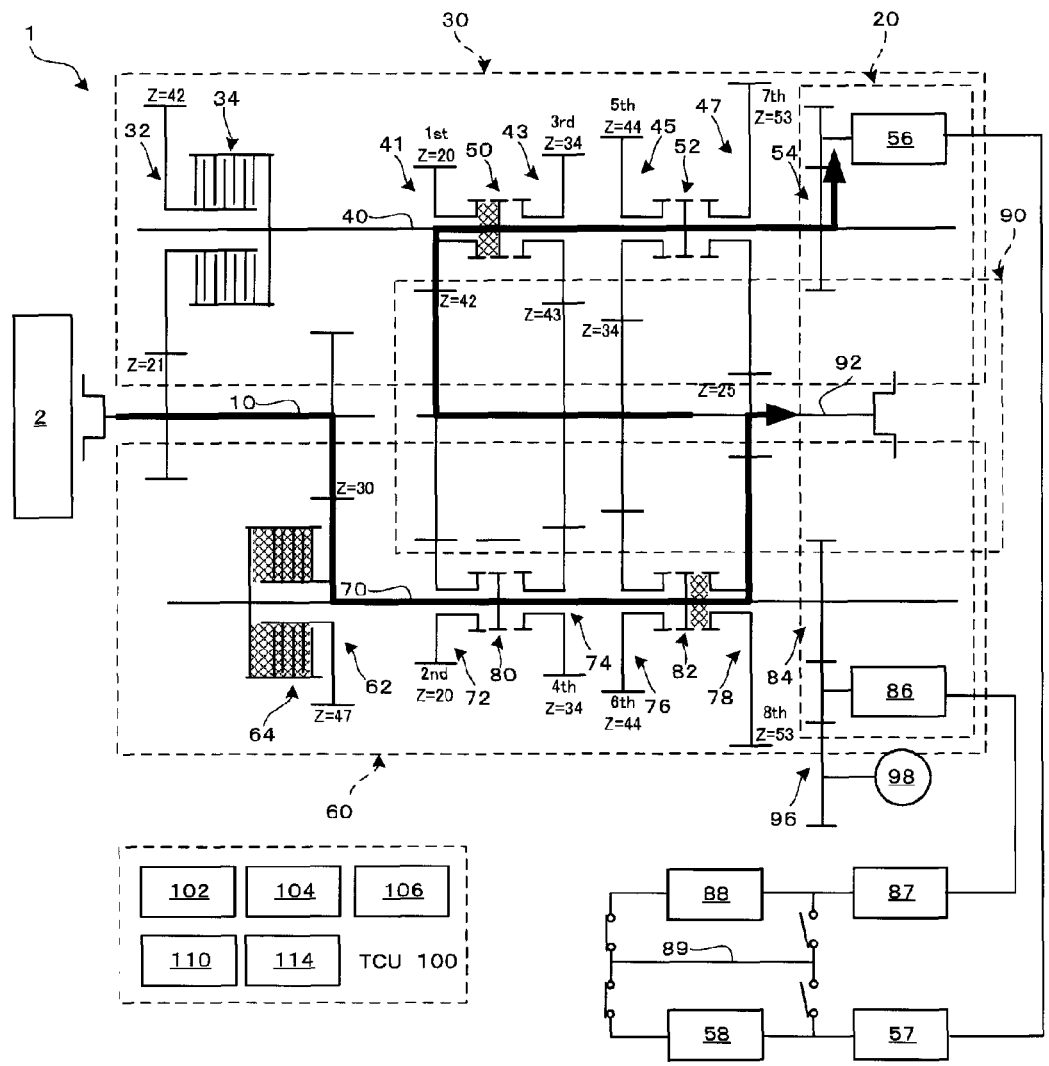
FIG. 15 is a diagram showing the flow of torque generated in the twin-clutch type hybrid transmission of the first embodiment during regeneration control.

It is assumed, for example, that the operation at the eighth speed with the engine 2 (operation by the even-numbered stage shift mechanism 60) continues stably to make the torque of the engine 2 redundant. In this case, as shown in FIG. 15, the regeneration controller 132 brings any one of the odd-numbered stages into the "engaged condition" by using the odd-numbered stage mechanical clutch 50 or 52 in the odd-numbered stage shift mechanism 30, and transmits the redundant power of the engine 2 to the odd-numbered stage motor 56 to regenerate the transmitted power, thereby charging the batteries 58 and 88. This allows the redundant energy of the engine 2 to be recovered electrically. A stage to be engaged with the odd-numbered stage mechanical clutch for the purpose of regeneration can be selected freely from the first, third, fifth and seventh speeds. However, it is preferable that a stage of a low number (such as the first speed) be engaged in order to enhance the efficiency of the regenerative brake. For engagement, the odd-numbered stage synchronization controller 120 temporarily drives the odd-numbered stage motor 56 to provide synchronization. Here, the "first speed engaged condition" is made to increase the number of rotations of the odd-numbered stage motor 56 to enhance regeneration efficiency. Meanwhile, a stage of an optimum number may be selected and then engaged appropriately according to running condition. Although not specifically shown in the drawings, while stable running such as the operation at the seventh speed is realized by the odd-numbered stage shift mechanism 30, for example, the even-numbered stage shift mechanism 60 may be responsible for regeneration.

<Emergency Start by Emergency Start Controller>

Figure 16:
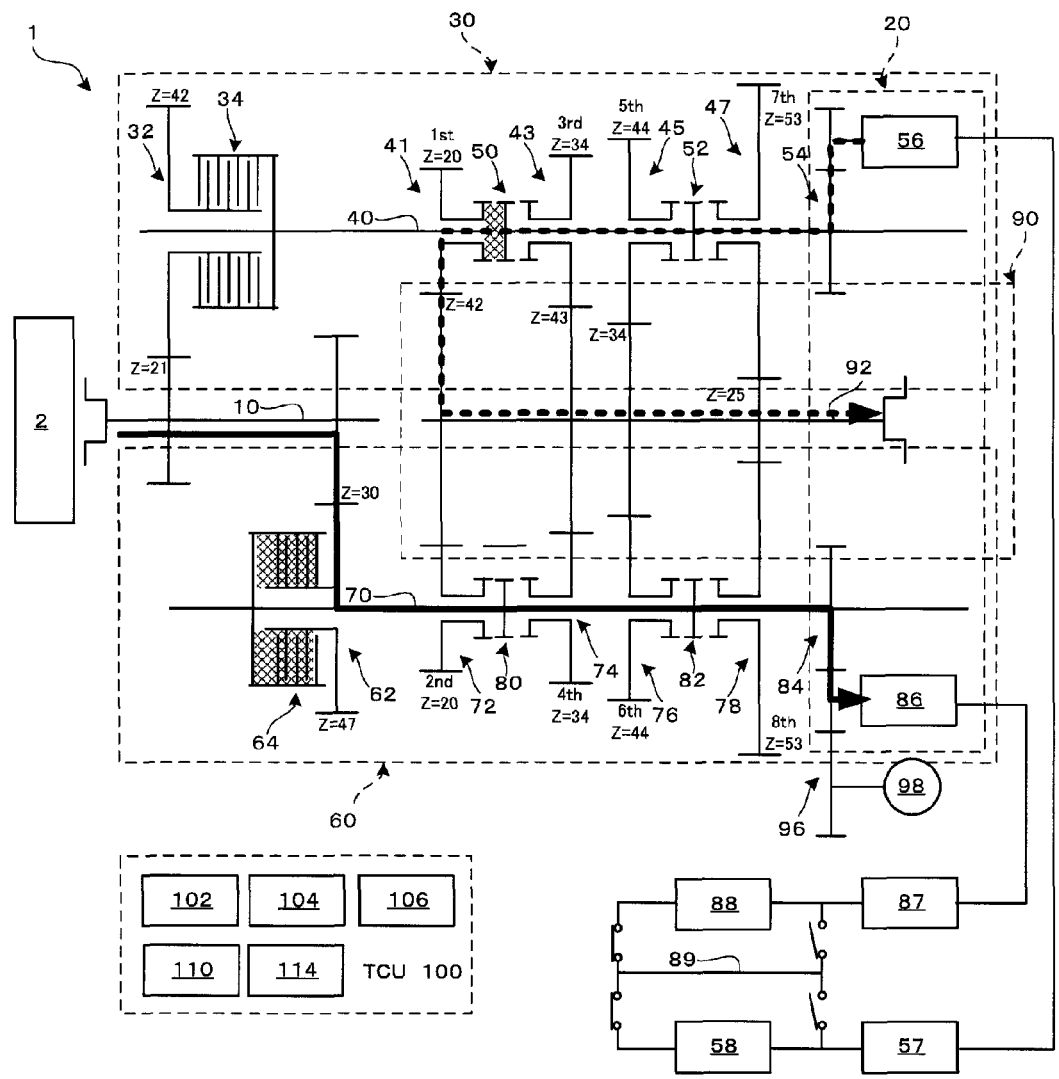
FIG. 16 is a diagram showing the flow of torque generated in the twin-clutch type hybrid transmission of the first embodiment during emergency start.

If the remaining capacities of both the batteries 58 and 88 are zero at the time of start, for example, the emergency start controller 134 starts the engine 2, releases the odd-numbered stage main clutch 34, and engages the even-numbered stage main clutch 64 as shown in FIG. 16. As a result, the even-numbered stage motor 86 is caused to rotate by the power of the engine 2 transmitted through the even-numbered stage transmission shaft 70, thereby charging the batteries 58 and 88. During the charge in this way, the "first speed engaged condition" is made by the odd-numbered stage mechanical clutch 50. Then, the odd-numbered stage motor 56 is caused to rotate by using the batteries 58 and 88 being charged to realize emergency start. This results in shortage of torque compared to general operation for start realized by using the two motors, but this satisfactorily fulfills a function for emergency purposes in response to exhaustion of the batteries 58 and 88. Here, the odd-numbered stage motor 56 in the odd-numbered stage shift mechanism 30 is used for start, and the even-numbered stage shift mechanism 60 is used for charge. However, start and charge may certainly be realized in the opposite way.

Figure 17:
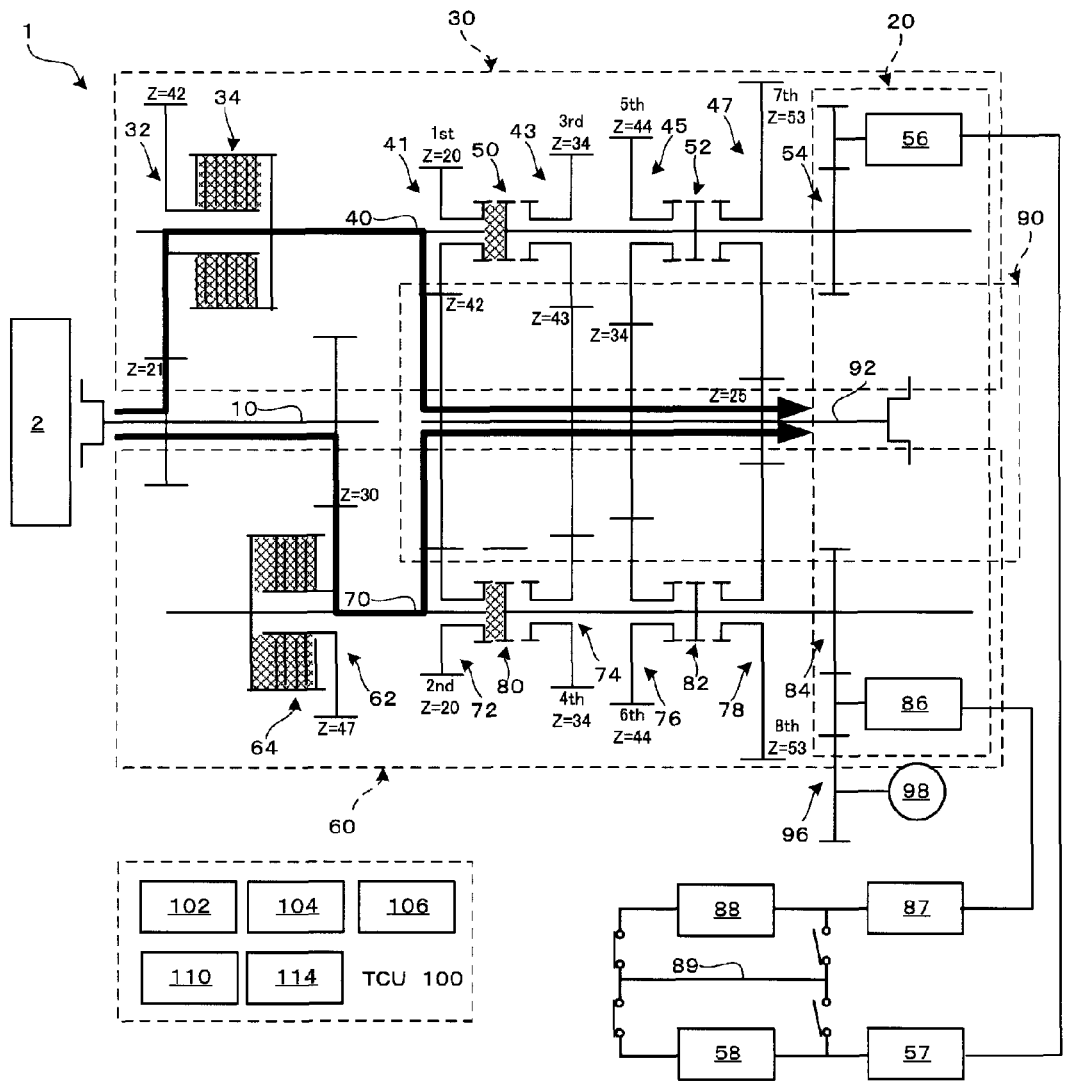
FIG. 17 is a diagram showing the flow of torque generated in the twin-clutch type hybrid transmission of the first embodiment during emergency start with a diesel engine.

If both the batteries 58 and 88 are broken, for further emergency purposes, the odd-numbered stage mechanical clutch 50 may be engaged to make the "first speed engaged condition," and at the same time, the even-numbered stage mechanical clutch 80 may be engaged to make the "second speed engaged condition" as shown in FIG. 17. Then, while both the odd-numbered stage main clutch 34 and the even-numbered stage main clutch 64 in a halfway condition are caused to slip, the power of the engine 2 may be transmitted to the output shaft 92, thereby making start. Departure of a dump truck and the like requires transmission of commensurate torque. Meanwhile, using both the odd-numbered stage main clutch 34 and the even-numbered stage main clutch 64 at the same time can reduce a load to be placed on each of the main clutches 34 and 64 by half, thereby realizing compact sizes of the main clutches 34 and 64.

As described above, in the transmission 1 of the present embodiment employing the twin-clutch type shift mechanisms, the motor power mechanism 20 includes the odd-numbered stage motor 56 for the odd-numbered stages and the even-numbered stage motor 86 for the even-numbered stages. This realizes synchronization control of the mechanical clutches with the motors 56 and 86. As a result, a synchromesh or a wet type multiple disc clutch dedicated to synchronization becomes unnecessary. Further, synchronization promptly made by the motors 56 and 86 realizes prompt shift-up and shift-down. Using the two motors 56 and 86 also allows size reduction of each of the motors. In addition, substantially complete synchronization is realized by the motors, allowing the mechanical clutches to engage the transmission shafts 40 and 70 and corresponding shift gear trains. Idling loss generated by the mechanical clutches during a disengaged condition is remarkably smaller than that generated by a wet type multiple disc clutch, so that transmission efficiency determined during operation is enhanced considerably.

In addition, in the transmission 1, high-torque operation for start (backward motion) is allowed by using the motors 56 and 86 effectively. This eliminates the need to provide the engine 2 with a torque converter. Accordingly, transmission loss by a torque converter during low-speed operation will not occur, making it possible to enhance transmission efficiency. Even if lockup is achieved during high-speed operation, use of a torque converter generates internal loss due to collision of oil in the converter with an impeller. However, the transmission 1 does not require a torque converter in the first place, making it possible to enhance transmission efficiency during high-speed operation. In addition, the transmission 1 includes wet type multiple disc clutches only at two places (as the main clutches 34 and 64). Further, even if one of these two wet type multiple disc clutches is in the "disengaged condition," idling loss can be made small because of a small difference in rotation between the input and output thereof. Additionally, generation of heat at the wet type multiple disc clutches is suppressed, thereby eliminating the need for a radiator for cooling of oil. This leads to enhancement of durability of each of the wet type multiple disc clutches.

Making a torque converter unnecessary can reduce the overall length of the transmission 1 significantly. In addition, a motor can be used during start that requires high torque. This eliminates the need for transmission of the power of the engine 2 through the odd-numbered stage and even-numbered stage main clutches 34 and 64, and accordingly, the capacities of the odd-numbered stage and even-numbered stage main clutches 34 and 64 can be reduced. This can also realize compact size of the transmission 1.

Even if the batteries 58 and 88 are completely exhausted, the transmission 1 makes one of the odd-numbered stage and even-numbered stage shift mechanisms 30 and 60 charge the batteries 58 and 88 by using the power of the engine 2, and makes the other of the odd-numbered stage and even-numbered stage shift mechanisms 30 and 60 to make start with a motor. Accordingly, these features unique to the twin-clutch type are reasonably used to allow reliable operation for start.

In addition, the transmission 1 can assist the power of the engine 2 by using the motors 56 and 86, making it possible to enhance acceleration performance. For example, shortage of torque of the engine 2 to be generated during uphill move and the like can be compensated for by assistance with the motors 56 and 86. As a result, the capacity of the engine 2 can be reduced.

Further, the transmission 1 makes the two motors 56 and 86 activate the regenerative brake, allowing efficient recovery of energy. The transmission 1 can also make the two motors 56 and 86 regenerate the redundant energy of the engine 2 efficiently during stable running at the seventh or eighth speed, making it possible to enhance fuel efficiency.

Still further, as a result of provision of the two batteries 58 and 88, the transmission 1 can continue running with one of the batteries in the case of breakdown of the other battery. Even if both the batteries 58 and 88 are broken, the engine 2 realizes start while the main clutches 34 and 64 are each placed in a halfway engaged condition, meaning that the transmission 1 can respond to an emergency flexibly.

In addition, the transmission 1 can operate the actuator 98 for external work using the motors 56 and 86. Accordingly, work to be conducted while vehicle is stopped is driven electrically, making it possible to reduce noise during the work. For example, in order to bring a loading platform or a crane up with a hydraulic motor during nighttime hours, for example, use of a motor as a driving source allows work to be performed quietly. In order to bring the loading platform or the crane down, the potential energy thereof is transmitted through the hydraulic motor to the motors 56 and 88, thereby allowing regeneration of the potential energy.

Further, in the transmission 1, adjacent shift gear trains such as the first-speed shift gear train 41 and the second-speed shift gear train 72 have substantially the same gear ratio. This allows the first-speed shift gear train 41 and the second-speed shift gear train 72 to use the same shift gears, or to share the shift gear of the output shaft 92. While the transmission 1 has an eight-stage structure, sharing of a shift gear makes the size in the directions of the shafts be substantially a level corresponding to four stages, allowing significant size reduction of the transmission 1. As a matter of course, the transmission 1 may also be of a structure placing high priority to a speed ratio in which a shift gear is not shared.

Additionally, in the present embodiment, the ratio of rotation of the even-numbered stage transmission shaft 70 to the rotation of odd-numbered stage transmission shaft 40, namely a proportion (ratio) between the ratio of rotation of the odd-numbered stage transmission gear train 32 and that of the even-numbered stage transmission gear train 62, is substantially the same as the interstage ratio of 1.289. As a result, shift gear trains in adjacent shift stages such as the first-speed shift gear train 41 and the second-speed shift gear train 72 can have substantially the same gear ratio as described above. The reason therefor is that a target interstage ratio can be maintained by the ratio of rotation of the odd-numbered stage transmission gear train 32 and that of the even-numbered stage transmission gear train 62 (corresponding to the interstage ratio). A ratio between the gear ratio of the second-speed shift gear train 72 and that of the third-speed shift gear train 43 is set at a value (1.66) corresponding substantially to the square of the interstage ratio (1.289). These settings allow simplified control during shift or switch between shifts.

For example, in the present embodiment, synchronization between the first odd-numbered stage shift gear train 41 and the second even-numbered stage shift gear train 72 during upshift or downshift therebetween can be made by causing the odd-numbered stage transmission shaft 40 and the even-numbered stage transmission shaft 70 to rotate at the same speed. This also applies to the cases between the third odd-numbered stage shift gear train 43 and the fourth even-numbered stage shift gear train 74, between the fifth odd-numbered stage shift gear train 45 and the sixth even-numbered stage shift gear train 76, and between the seventh odd-numbered stage shift gear train 47 and the eighth even-numbered stage shift gear train 78. Also, synchronization between the second even-numbered stage shift gear train 72 and the third odd-numbered stage shift gear train 43 during upshift or downshift therebetween can be made by causing the odd-numbered stage transmission shaft 40 and even-numbered stage transmission shaft 70 to rotate at a ratio corresponding to a value that is close to the square of the interstage ratio. This also applies to the cases between the fourth even-numbered stage shift gear train 74 and the fifth odd-numbered stage shift gear train 45, and between the sixth even-numbered stage shift gear train 76 and the seventh odd-numbered stage shift gear train 47.

Figure 18:
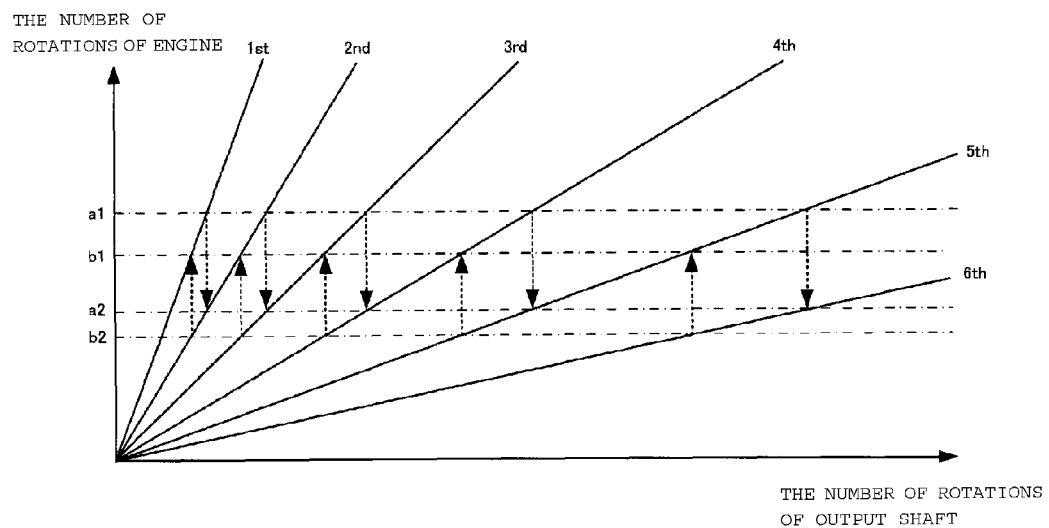
FIG. 18 is a view showing a timing chart that shows timing of upshift and timing of downshift of the twin-clutch type hybrid transmission of the first embodiment.

Accordingly, if speeds of rotation a1 and a2 of an engine determined before and after upshift, and speeds of rotation b1 and b2 of the engine determined before and after downshift are set at substantially the constant speeds in all speed stages, the odd-numbered stage transmission shaft 40 and the even-numbered stage transmission shaft 70 are allowed to rotate at substantially the constant speeds of rotation in all the speed stages during upshift and downshift as shown in FIG. 18. This simplifies synchronization control when a speed stage is switched, making it possible to shorten time for shift. Synchronization can be made during switching between speed stages only by using DC motors as the odd-numbered stage motor 56 and the even-numbered stage motor 86 in the motor power mechanism 20, and by controlling voltages at two voltage values for upshift and downshift respectively, for example. As a result, an inverter used for motor control can be omitted.

[First Modification of First Embodiment]

Figure 19:
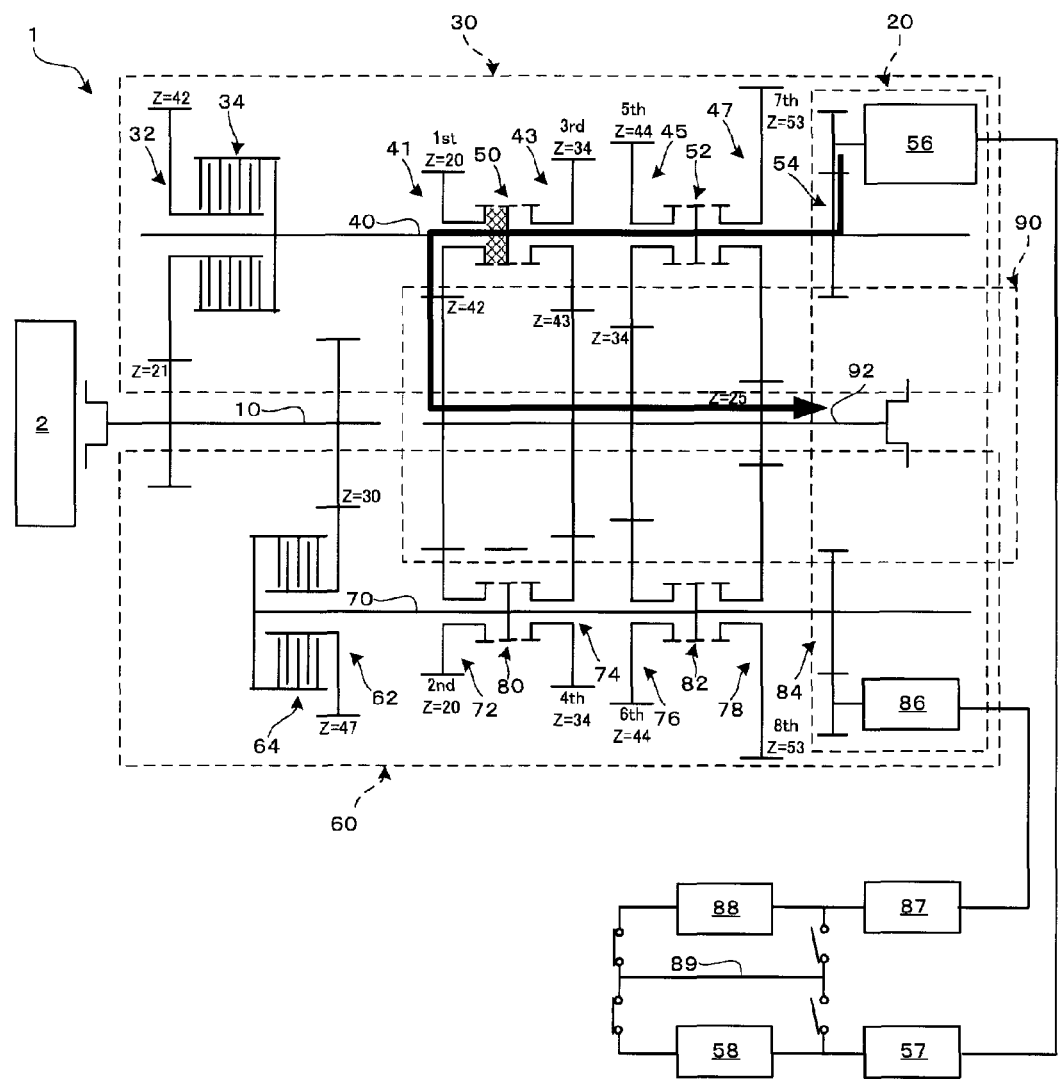
FIG. 19 is a diagram showing the flow of torque generated in a twin-clutch type hybrid transmission of a first modification of the first embodiment during start.

FIG. 19 shows a modification of the transmission 1 of the first embodiment. In this transmission 1, the odd-numbered stage motor 56 and the even-numbered stage motor 86 in the motor power mechanism 20 have different capacities. In particular, the capacity of the odd-numbered stage motor 56 is made higher than that of the even-numbered stage motor 86. The even-numbered stage motor 86 is responsible only for operation for synchronization during switching between speed stages. Meanwhile, the odd-numbered stage motor 56 is responsible for operation for start, operation for assisting an engine, operation for activating a regenerative brake, and operation for engine regeneration in addition to the operation for synchronization.

As shown in FIG. 19, for start, the even-numbered stage mechanical clutch 50 is engaged to make the "first speed engaged condition" while the transmission 1 is stopped, and the odd-numbered stage motor 56 is caused to rotate, thereby realizing start. The capacity of the odd-numbered stage motor 56 is determined such that it can obtain torque sufficient for start by itself, thereby allowing start by high-torque drive.

Figure 20:
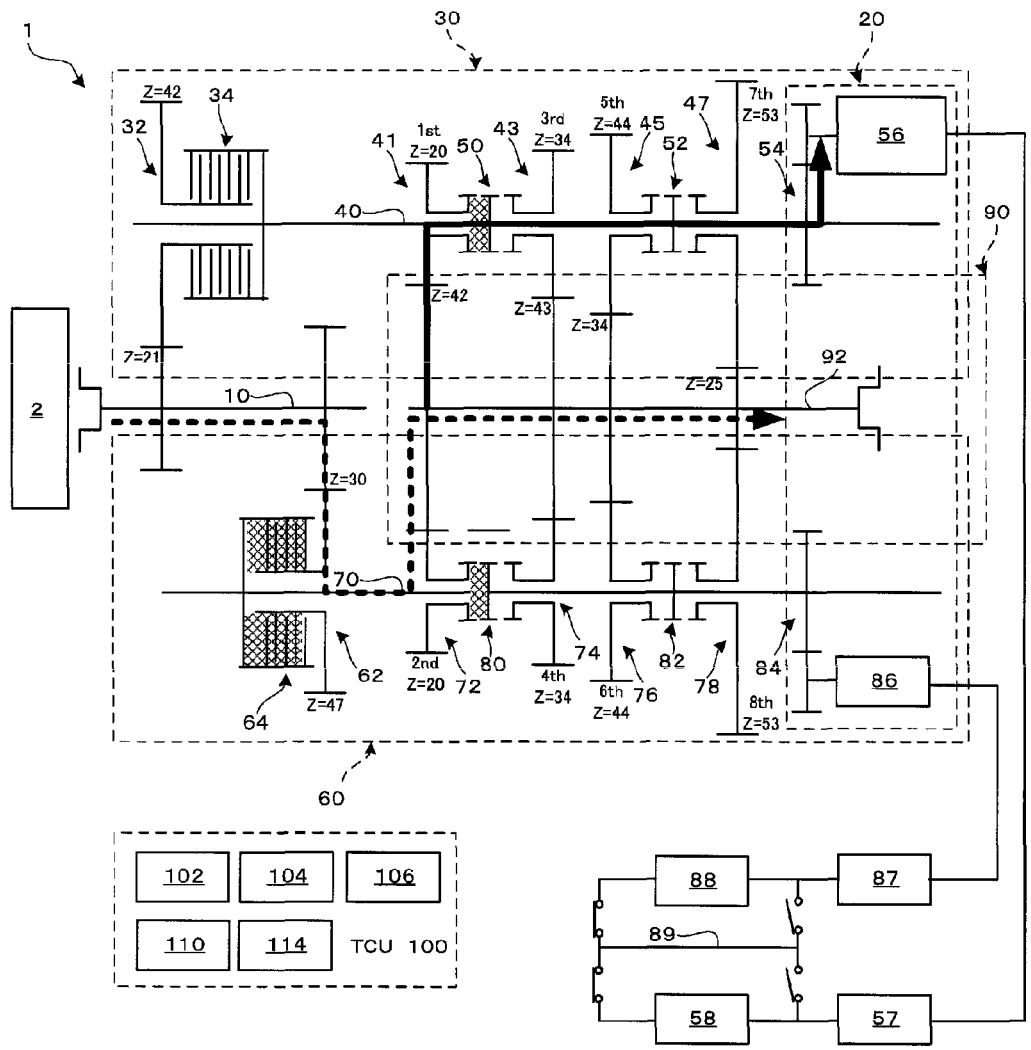
FIG. 20 is a diagram showing the flow of torque generated in the twin-clutch type hybrid transmission of the first modification of the first embodiment when a regenerative brake is activated.

Further, for the operation for activating the regenerative brake and for the operation for engine regeneration, any one of the odd-numbered stages is brought into the "engaged condition" as shown in FIG. 20. Then, the redundant power or redundant inertial force of the engine 2 is transmitted to the odd-numbered stage motor 56 having a high capacity, thereby regenerating the redundant power or inertial force for charge. Such active use of the high-capacity odd-numbered stage motor 56 in the operation for regeneration makes it possible to enhance regeneration efficiency.

Figure 21:
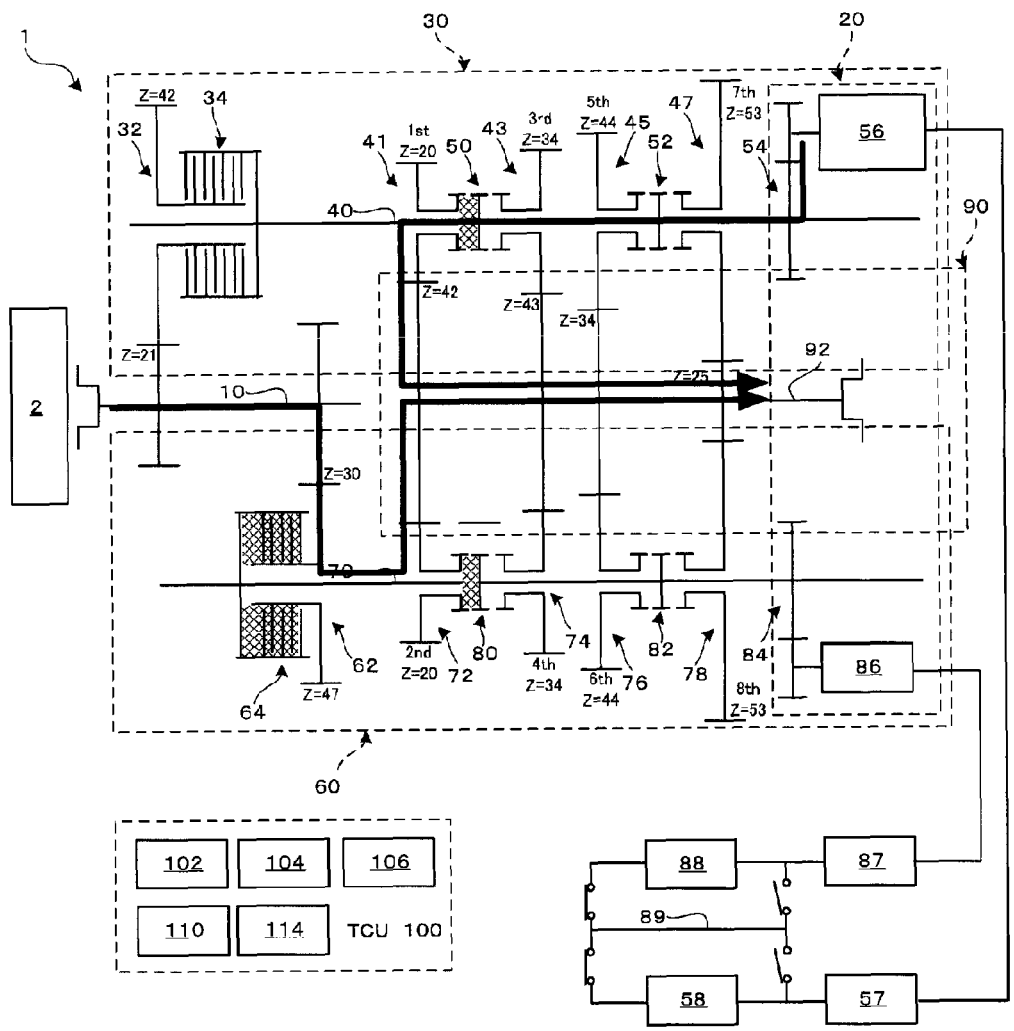
FIG. 21 is a diagram showing the flow of torque generated in the twin-clutch type hybrid transmission of the first modification of the first embodiment during assist control.

Further, for rapid acceleration during operation at the second speed with the engine 2, the odd-numbered stage mechanical clutch 50 is engaged to bring the first speed in an engaged condition simultaneously as shown in FIG. 21. Then, the odd-numbered stage motor 56 is driven to realize power assist. As a result, the torque of the engine 2 is compensated for by the high-capacity odd-numbered stage motor 56 during operation in an even-numbered stage, thereby allowing rapid acceleration. Further, only drive of the odd-numbered stage motor 56 can certainly realize power assist to compensate for the torque of the engine 2 during operation in an odd-numbered stage.

[Second Modification of First Embodiment]

Figure 22:
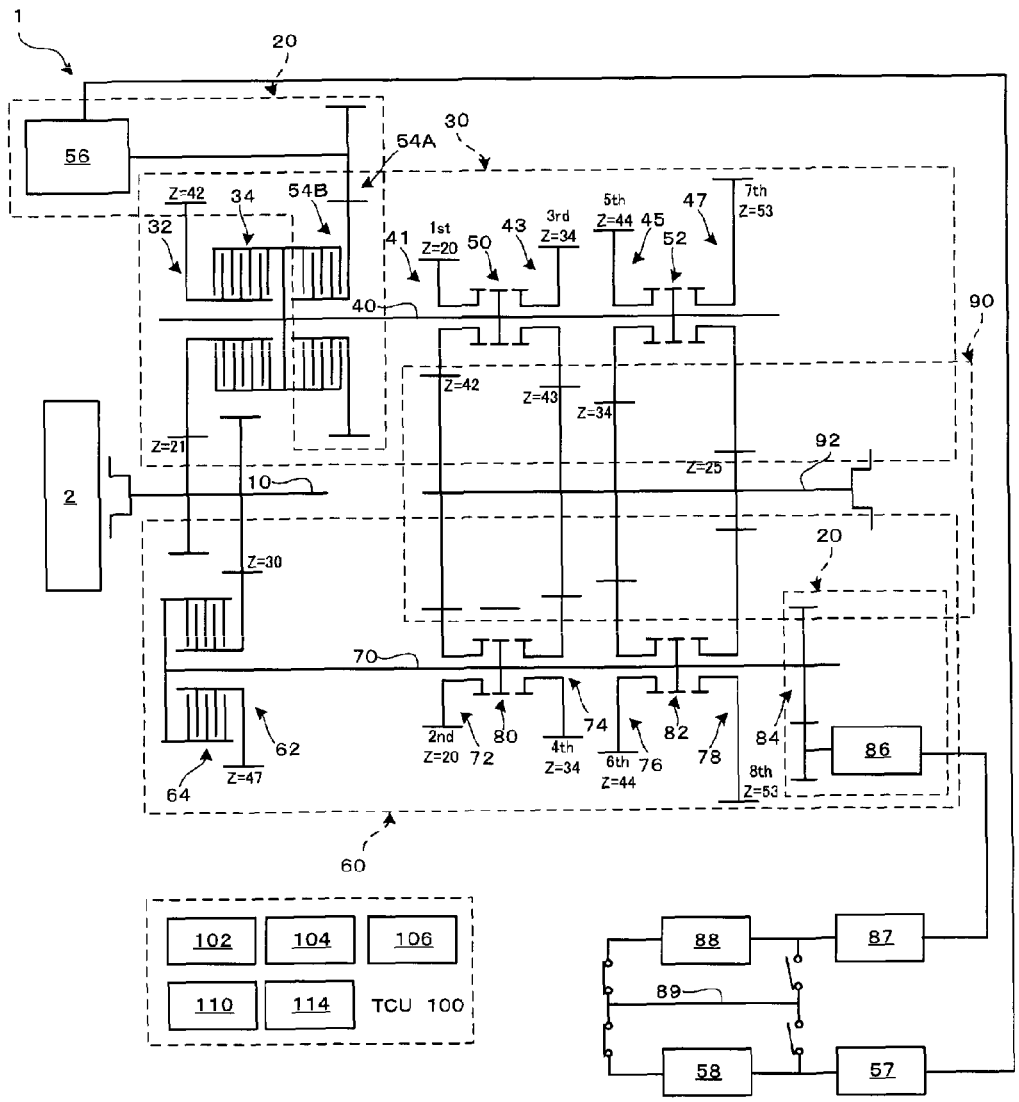
FIG. 22 is a diagram showing the flow of torque generated in a twin-clutch type hybrid transmission of a second modification of the first embodiment during start.

FIG. 22 shows a second modification of the transmission 1 of the first embodiment. In this transmission 1, the capacity of the odd-numbered stage motor 56 is higher than that of the even-numbered stage motor 86 in the motor power mechanism 20. Further, the motor power mechanism 20 includes a gear train 54A for an odd-numbered stage motor and provided to the odd-numbered stage transmission shaft 40, and an odd-numbered stage motor clutch 54B for selectively engaging the odd-numbered stage motor 56 and the odd-numbered stage transmission shaft 40. The odd-numbered stage motor 56 is juxtaposed to the engine 2. The odd-numbered stage motor clutch 54B is arranged next to the odd-numbered stage main clutch 34.

The high-capacity odd-numbered stage motor 56 generates large idling loss while it is not used. The idling loss of the odd-numbered stage motor 56 is generally prevented by releasing the odd-numbered stage motor clutch 54B. If the odd-numbered stage motor 56 is used for operation for synchronization or operation for regeneration during switching between speed stages, the odd-numbered stage motor clutch 54B is engaged. This can enhance the efficiency of power transmission. In addition, in this transmission 1, placing the high-capacity odd-numbered stage motor 56 in juxtaposition to the engine 2 allows the compact size of the transmission 1 in the direction of the shafts.

The specifications of the odd-numbered stage motor clutch 54B are not limited. A wet type multiple disc clutch or a mechanical clutch may be employed as the odd-numbered stage motor clutch 54B.

[Second Embodiment]

Figure 23:
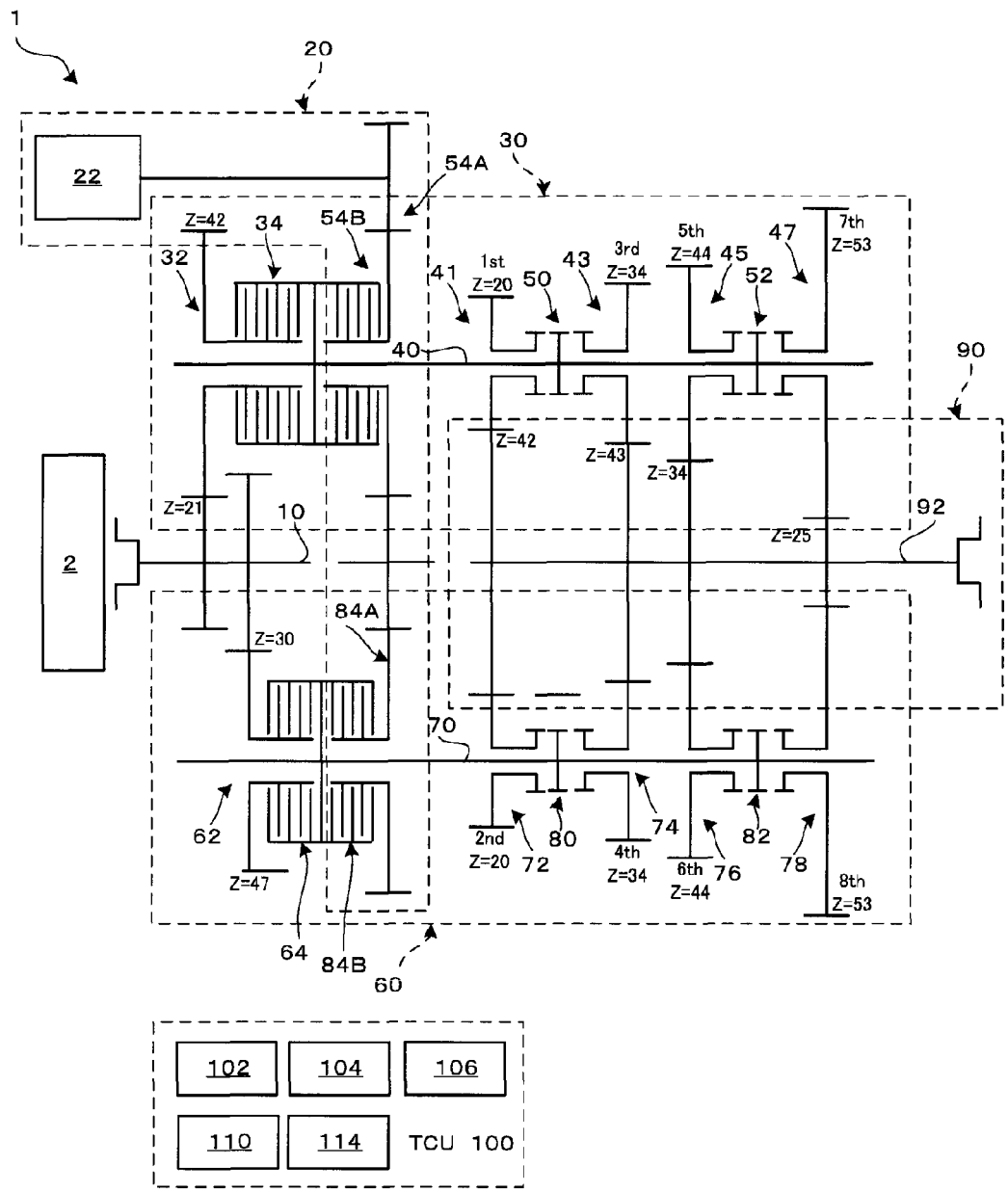
FIG. 23 is a skeleton diagram showing the overall structure of a twin-clutch type hybrid transmission of a second embodiment of the present invention.

FIG. 23 shows a transmission 1 of a second embodiment. The structure of this transmission 1 is the same as that of the transmission 1 of the first embodiment except for the motor power mechanism 20. Accordingly, the motor power mechanism 20 is mainly described here in detail.

The motor power mechanism 20 includes a common synchronization motor 22, a gear train 54A for an odd-numbered stage motor and provided to the odd-numbered stage transmission shaft 40, an odd-numbered stage motor clutch 54B for selectively engaging the common synchronization motor 22 and the odd-numbered stage transmission shaft 40, a gear train 84A for an even-numbered stage motor and provided to the even-numbered stage transmission shaft 70, and an even-numbered stage motor clutch 84B for selectively engaging the common synchronization motor 22 and the even-numbered stage transmission shaft 70. Unlike the first embodiment, this can cause both the odd-numbered stage transmission shaft 40 and the even-numbered stage transmission shaft 70 to rotate by using one common synchronization motor 22.

Figure 24:
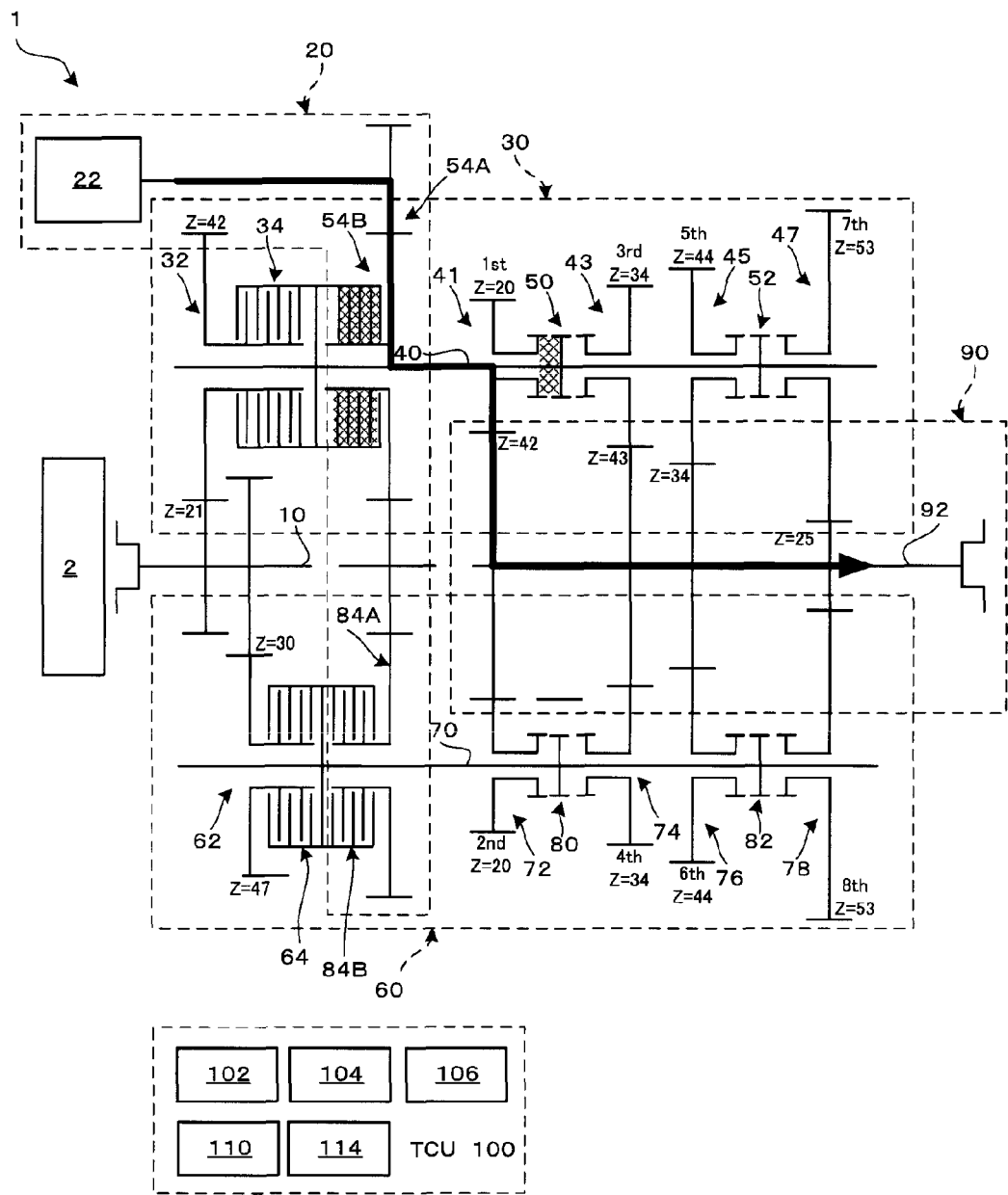
FIG. 24 is a diagram showing the flow of torque generated in the twin-clutch type hybrid transmission of the second embodiment during start.

By way of example, in order to make start while the transmission 1 is stopped, the odd-numbered stage mechanical clutch 50 is engaged to make the "first speed engaged condition," and at the same time, the odd-numbered stage motor clutch 54B is engaged to cause the common synchronization motor 22 to rotate as shown in FIG. 24. As a result, the power of the common synchronization motor 22 is transmitted to the output shaft 92 to allow start by high-torque drive.

Figure 25:
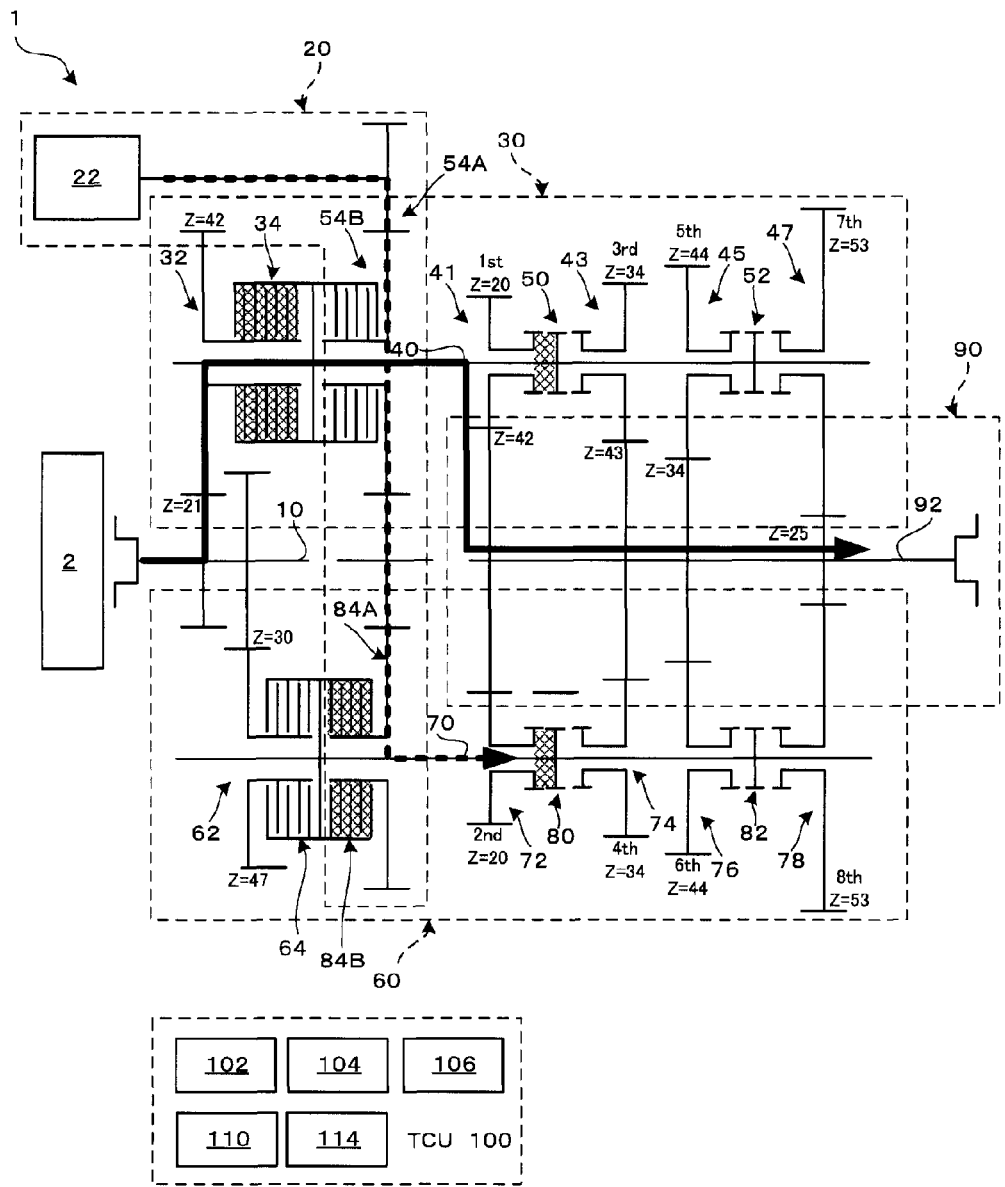
FIG. 25 is a diagram showing the flow of torque generated in the twin-clutch type hybrid transmission of the second embodiment during preparations for the second speed.

Further, as shown in FIG. 25, for shift-up to the second speed during running with an engine at the first speed, the odd-numbered stage motor clutch 54B is released and the even-numbered stage motor clutch 84B is engaged, thereby making the common synchronization motor 22 control synchronization of the even-numbered stage transmission shaft 70. This engages the even-numbered stage mechanical clutch 80, so that the "second speed engaged condition" can be made. As a result, preparations for shift-up to the second speed are completed.

For activation of a regenerative brake or regeneration of the power of the engine 2, the odd-numbered stage motor 54B or the even-numbered stage motor clutch 84B is engaged to transmit the redundant power or inertial force of the engine 2 to the common synchronization motor 22 for regeneration.

Figure 26:
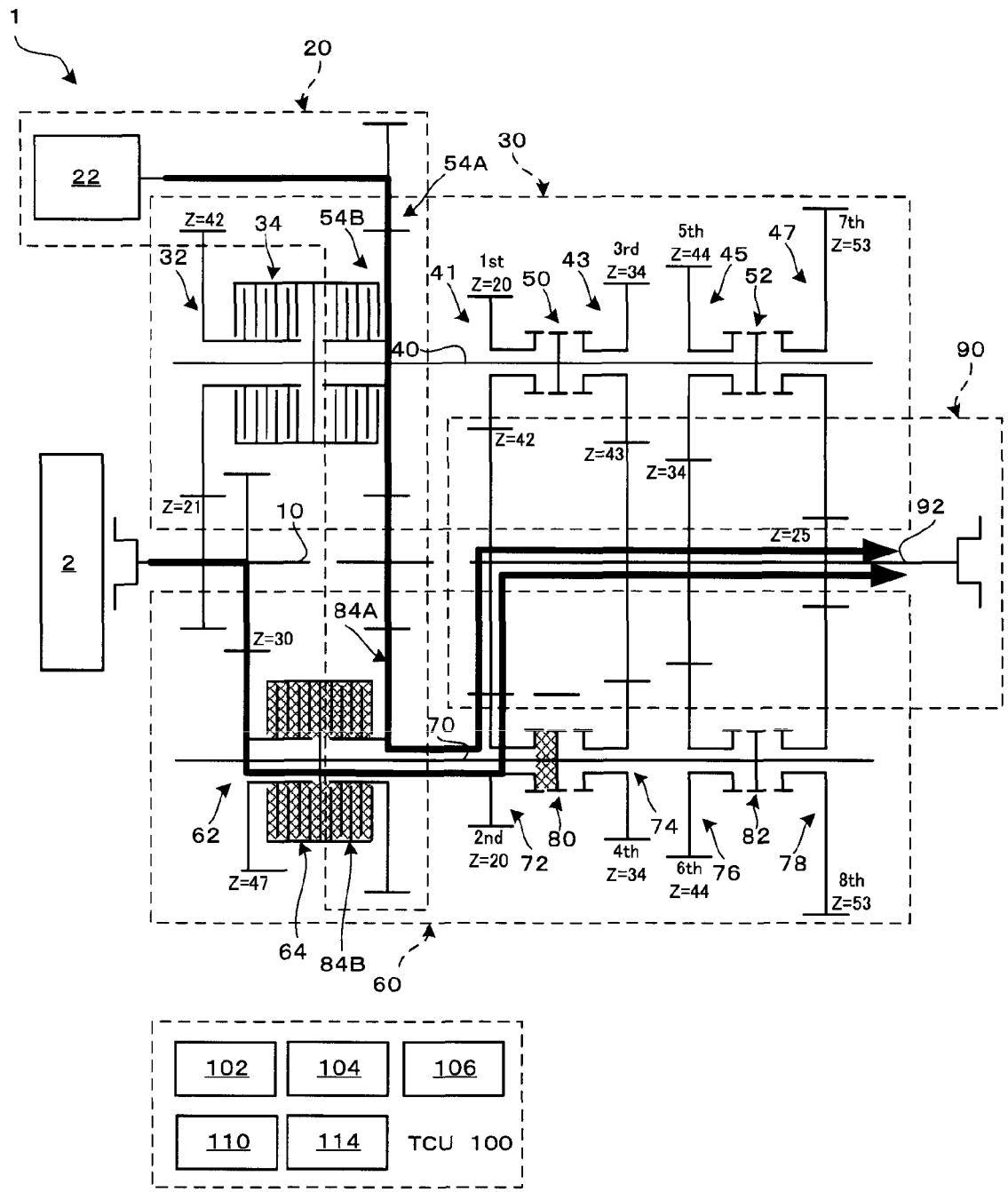
FIG. 26 is a diagram showing the flow of torque generated in the twin-clutch type hybrid transmission of the second embodiment during assist control.

Further, for rapid acceleration during the operation at the second speed with the engine 2, for example, the even-numbered stage motor clutch 84B is engaged and the common synchronization motor 22 is driven to assist power as shown in FIG. 26. This makes the high-capacity common synchronization motor 22 compensate for the torque of the engine 2, thereby allowing rapid acceleration.

Idling loss to be generated when the common synchronization motor 22 is stopped can be prevented by releasing both the odd-numbered stage motor clutch 54B and the even-numbered stage motor clutch 84B.

[Third Embodiment]

Figure 27:
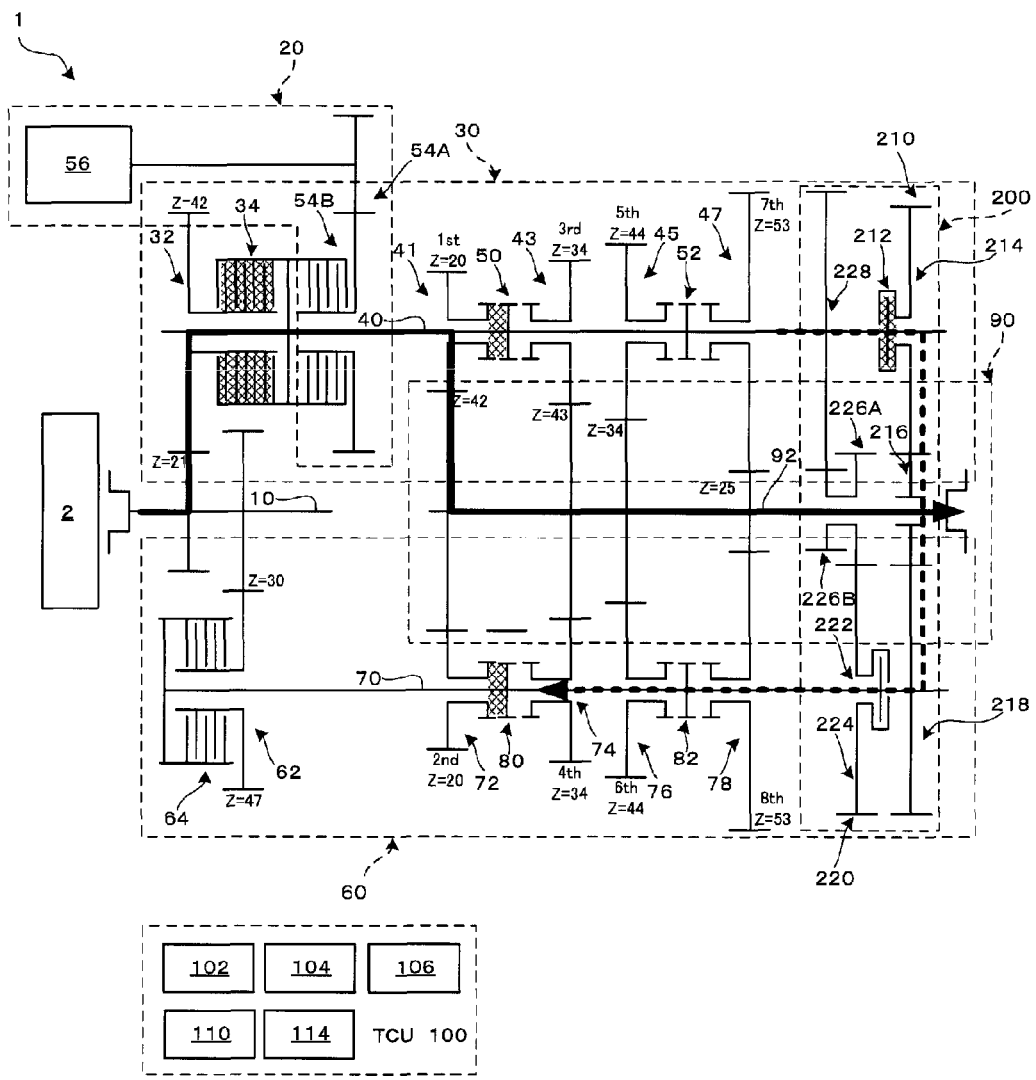
FIG. 27 is a diagram showing the flow of torque generated in a twin-clutch type hybrid transmission of a third embodiment of the present invention during preparations for the second speed.

FIG. 27 shows a transmission 1 according to a third embodiment. The structure of this transmission 1 is the same as that of the transmission 1 of the first embodiment except for the motor power mechanism 20 and a synchronization shift mechanism 200 described later. Accordingly, the motor power mechanism 20 and the mechanical synchronization mechanism 200 are mainly described here in detail.

The motor power mechanism 20 includes an odd-numbered stage motor 56, a gear train 54A for an odd-numbered stage motor and provided to the odd-numbered stage transmission shaft 40, and an odd-numbered stage motor clutch 54B for selectively engaging the odd-numbered stage motor 56 and the odd-numbered stage transmission shaft 40. The odd-numbered stage motor 56 is used not for the purpose of synchronization, but for the purposes of assisting power for the engine 2 and achieving regeneration.

The synchronization shift mechanism 200 provides synchronization between the odd-numbered stage shift mechanism 30 and the even-numbered stage shift mechanism 60 during gear shift. The synchronization shift mechanism 200 includes a first synchronization gear train 210 and a second synchronization gear train 220. The first synchronization gear train 210 selectively engages the odd-numbered stage transmission shaft 40 and the even-numbered stage transmission shaft 70 such that the odd-numbered stage transmission shaft 40 and the even-numbered stage transmission shaft 70 rotate at a first ratio of rotation. More specifically, the first synchronization gear train 210 includes a first synchronization clutch 212 provided to the odd-numbered stage transmission shaft 40, a first odd-numbered stage synchronization gear 214 coupled to the first synchronization clutch 212, a first intermediate synchronization gear 216 provided to the output shaft 92 such that the first intermediate synchronization gear 216 is freely rotatable relative to the output shaft 92 while being in meshing engagement with the first odd-numbered stage synchronization gear 214, and a first even-numbered stage synchronization gear 218 fixed to the even-numbered stage transmission shaft 70 while being in meshing engagement with the first intermediate synchronization gear 216. In the present embodiment, the first odd-numbered stage synchronization gear 214 and the first even-numbered stage synchronization gear 218 have the same number of teeth. Accordingly, the first ratio of rotation is "substantially 1." Thus, once the first synchronization clutch 212 is connected, the odd-numbered stage transmission shaft 40 and the even-numbered stage transmission shaft 70 rotate at the same speed.

The second synchronization gear train 220 selectively engages the odd-numbered stage transmission shaft 40 and the even-numbered stage transmission shaft 70 such that the odd-numbered stage transmission shaft 40 and the even-numbered stage transmission shaft 70 rotate at a second ratio of rotation. More specifically, the second synchronization gear train 220 includes a second synchronization clutch 222 provided to the even-numbered stage transmission shaft 70, a second even-numbered stage synchronization gear 224 coupled to the second synchronization clutch 222, a second large-diameter intermediate synchronization gear 226A provided to the output shaft 92 such that the second large-diameter intermediate synchronization gear 226A is freely rotatable relative to the output shaft 92 while being in meshing engagement with the second even-numbered stage synchronization gear 224, a second small-diameter intermediate synchronization gear 226B coaxially coupled to the second large-diameter intermediate synchronization gear 226A and having a smaller number of teeth than the second large-diameter intermediate synchronization gear 226A, and a second odd-numbered stage synchronization gear 228 fixed to the odd-numbered stage transmission shaft 40 while being in meshing engagement with the second small-diameter intermediate synchronization gear 226B. In the present embodiment, the second ratio of rotation is different from the first ratio of rotation. More specifically, the second ratio of rotation is the same as a value that is "close to the square of an interstage ratio" between the first to eighth speeds. The synchronization shift mechanism accelerates (or decelerates) the idling (or stopped) odd-numbered stage transmission shaft (or even-numbered stage transmission shaft) to the number of rotations for synchronization. Meanwhile, this acceleration (deceleration) is achieved only by inertial force. Thus, the synchronization shift mechanism can be composed of a small-capacity gear and a small-capacity clutch, allowing the compact size thereof. The first synchronization clutch 212 and the second synchronization clutch 222 are engaged with each other while generating a difference in rotation therebetween. Accordingly, wet type multiple disc clutches are used as the first and second synchronization clutches 212 and 222.

For synchronization between the input gear of the second-speed shift gear train 72 and the even-numbered stage transmission shaft 70 during running with an engine at the first speed, for example, the first synchronization gear train 210 of the synchronization shift mechanism 200 is engaged as shown in FIG. 27 to forcibly make the odd-numbered stage transmission shaft 40 and the even-numbered stage transmission shaft 70 rotate at the same speed (at a ratio of 1). This provides synchronization between the rotation of the even-numbered stage transmission shaft 70 and the rotation of the second-speed shift gear train 72, so that the even-numbered stage mechanical clutch 80 can be engaged to make the "second speed engaged condition." Accordingly, preparations for shift-up to the second speed are completed.

Figure 28:
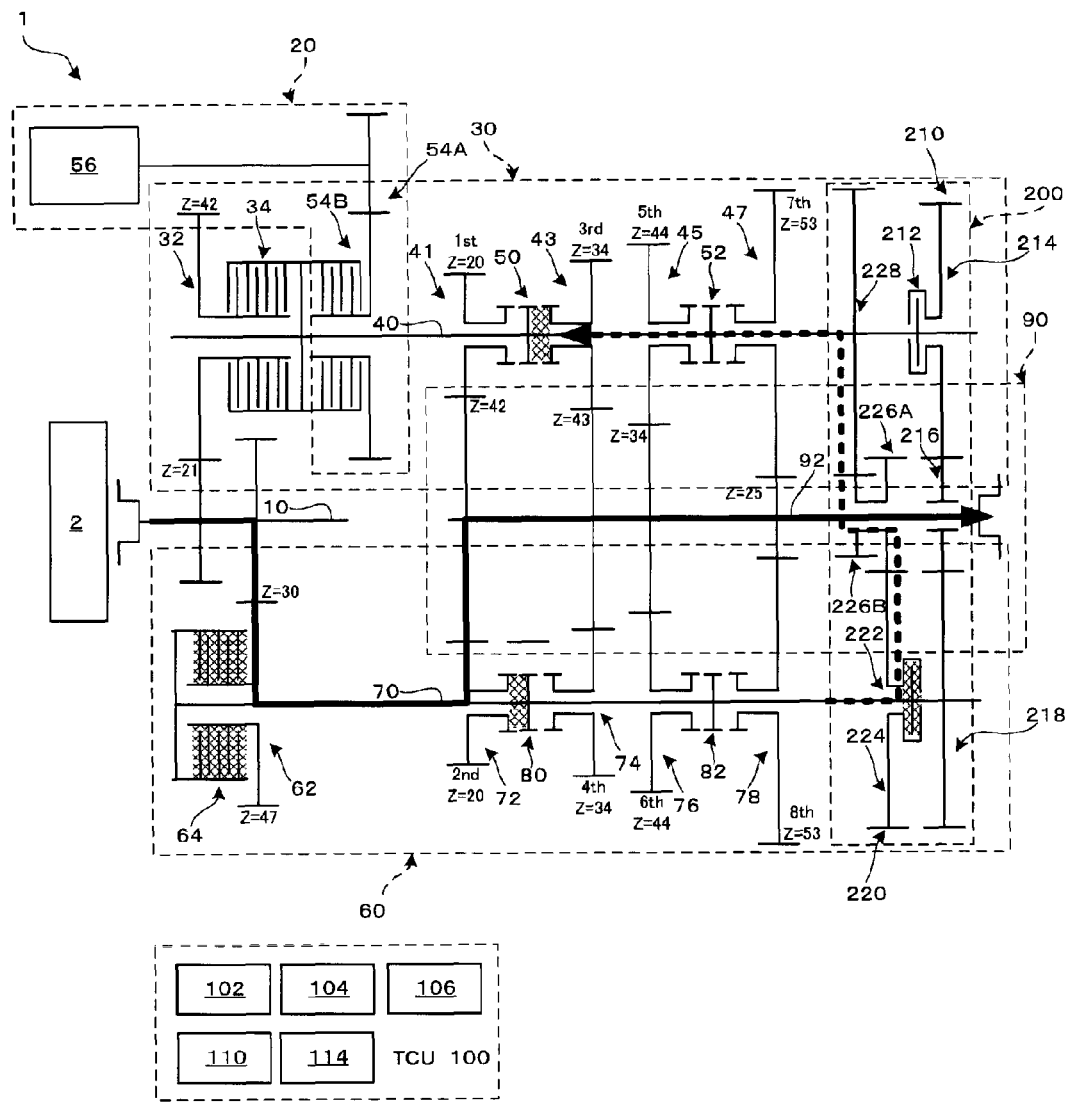
FIG. 28 is a diagram showing the flow of torque generated in the twin-clutch type hybrid transmission of the third embodiment during preparations for the third speed.

Also for example, for synchronization between the input gear of the third-speed shift gear train 43 and the odd-numbered stage transmission shaft 40 during running with the engine at the second speed, the second synchronization gear train 220 of the synchronization shift mechanism 200 is engaged as shown in FIG. 28 to forcibly make the odd-numbered stage transmission shaft 40 and the even-numbered stage transmission shaft 70 rotate at a ratio (about 1.66) corresponding to the square of the aforementioned interstage ratio. This provides synchronization between the rotation of the odd-numbered stage transmission shaft 40 and the rotation of the third-speed shift gear train 43, so that the odd-numbered stage mechanical clutch 50 can be engaged to make the "third speed engaged condition." Accordingly, preparations for shift-up to the third speed are completed.

In the third embodiment, use of the synchronization shift mechanism 200 realizes mechanical conversion of the speed stages. This allows the odd-numbered stage motor 56 to be dedicated to assisting the engine 2 and regenerating power. In particular, even during running with an engine in an even-numbered stage, engaging the synchronization shift mechanism 200 allows the odd-numbered stage motor 56 to assist power and regenerate power.

A large dump truck is shown as an example of the use of the transmission 1 of the present embodiments. However, the use of the transmission 1 is not specifically limited, but the transmission 1 may be used for various applications such as a bus, a truck, an automobile, a construction machine, and a diesel railcar.

The transmission of the present invention is not limited to the embodiments described above, but can certainly be changed in various ways without departing from the gist of the present invention. For example, the transmission of the invention also covers an embodiment where motors are provided at the respective axial ends of first and second input shafts of Japanese Patent Application Laid-Open No. 2003-269592.

INDUSTRIAL APPLICABILITY

The twin-clutch type hybrid transmission of the invention can be used for various purposes relating to power transmission.

The invention claimed is:

1. A twin-clutch type hybrid transmission, characterized by comprising:
    an input shaft to receive power of an engine;
    an odd-numbered stage shift mechanism to which rotation of the input shaft is transmitted;
    an even-numbered stage shift mechanism to which the rotation of the input shaft is transmitted;
    a motor power mechanism for applying power of a motor to at least one of the odd-numbered stage shift mechanism and the even-numbered stage shift mechanism; and
    an output mechanism to which power of the odd-numbered stage shift mechanism and power of the even-numbered stage shift mechanism are transmitted, and characterized in that the odd-numbered stage shift mechanism includes:
    an odd-numbered stage transmission gear train for transmitting the rotation of the input shaft;
    an odd-numbered stage main clutch for selectively transmitting power of the odd-numbered stage transmission gear train to an odd-numbered stage transmission shaft;
    an odd-numbered stage shift gear train provided to the odd-numbered stage transmission shaft, for transmitting rotation to the output mechanism; and
    an odd-numbered stage mechanical clutch for selectively engaging the odd-numbered stage shift gear train and the odd-numbered stage transmission shaft, and in that the even-numbered stage shift mechanism includes:
    an even-numbered stage transmission gear train for transmitting the rotation of the input shaft;
    an even-numbered stage main clutch for selectively transmitting power of the even-numbered stage transmission gear train to an even-numbered stage transmission shaft;
    an even-numbered stage shift gear train provided to the even-numbered stage transmission shaft, for transmitting rotation to the output mechanism; and
    an even-numbered stage mechanical clutch for selectively engaging the even-numbered stage shift gear train and the even-numbered stage transmission shaft, and
    in that the motor power mechanism includes
    an odd-numbered stage motor for transmitting power to the odd-numbered stage transmission shaft, and
    an even-numbered stage motor for transmitting power to the even-numbered stage transmission shaft.

2. The twin-clutch type hybrid transmission according to claim 1, characterized in that the odd-numbered stage motor controls the rotation of the odd-numbered stage transmission shaft to provide synchronization with the odd-numbered stage mechanical clutch, and
    the even-numbered stage motor controls the rotation of the even-numbered stage transmission shaft to provide synchronization with the even-numbered stage mechanical clutch.

3. The twin-clutch type hybrid transmission according to claim 1, characterized in that the odd-numbered stage motor and the even-numbered stage motor have different capacities.

4. The twin-clutch type hybrid transmission according to claim 3, characterized in that at least one of the odd-numbered stage motor and the even-numbered stage motor having a higher capacity selectively transmits power to the odd-numbered stage transmission shaft or the even-numbered stage transmission shaft through a motor clutch.

5. The twin-clutch type hybrid transmission according to claim 3, characterized in that start is made by transmitting power of at least one of the odd-numbered stage motor and the even-numbered stage motor having a higher capacity to the output shaft.

6. The twin-clutch type hybrid transmission according to claim 3, characterized in that a regenerative brake is activated by at least one of the odd-numbered stage motor and the even-numbered stage motor having a higher capacity.

7. The twin-clutch type hybrid transmission according to 3, characterized in that the power of the engine is regenerated by at least one of the odd-numbered stage motor and the even-numbered stage motor having a higher capacity.

8. The twin-clutch type hybrid transmission according to claim 1, characterized by further comprising a transmission control unit for controlling transmission of the odd-numbered stage shift mechanism and the even-numbered stage shift mechanism, and characterized in that
the transmission control unit includes:
an output-side rotation sensor capable of directly or indirectly detecting the numbers of rotations of the odd-numbered stage shift gear train and the even-numbered stage shift gear train;
an odd-numbered stage synchronization controller for controlling the odd-numbered stage motor such that the number of rotations of the odd-numbered stage shift gear train and the rotation of the odd-numbered stage transmission shaft are in synchronization with each other; and
an even-numbered stage synchronization controller for controlling the even-numbered stage motor such that the number of rotations of the even-numbered stage shift gear train and the rotation of the even-numbered stage transmission shaft are in synchronization with each other.

9. The twin-clutch type hybrid transmission according to claim 8, characterized in that the transmission control unit includes a start controller for engaging both the odd-numbered stage mechanical clutch and the even-numbered stage mechanical clutch for start, and causing the odd-numbered stage motor and the even-numbered stage motor to rotate at the same time to transmit both the power of the odd-numbered stage motor and the power of the even-numbered stage motor to the output shaft.

10. The twin-clutch type hybrid transmission according to claim 8, characterized in that
the transmission control unit includes
an input-side rotation sensor capable of directly or indirectly detecting the number of rotations of the input shaft, and
a switching controller for determining a driving condition made by the engine, and stopping drive by the odd-numbered stage motor and the even-numbered stage motor.

11. The twin-clutch type hybrid transmission according to claim 8, characterized in that the transmission control unit includes a deceleration controller for engaging both the odd-numbered stage mechanical clutch and the even-numbered stage mechanical clutch, and transmitting the rotation of the output shaft to both the odd-numbered stage motor and the even-numbered stage motor, thereby activating a regenerating brake with the odd-numbered stage motor and the even-numbered stage motor.

12. The twin-clutch type hybrid transmission according to claim 8, characterized in that the transmission control unit includes an assist controller for assisting drive during acceleration with the engine by causing at least one of the odd-numbered stage motor and the even-numbered stage motor to rotate.

13. The twin-clutch type hybrid transmission according to claim 8, characterized in that the transmission control unit includes a regeneration controller for regenerating redundant energy with the even-numbered stage motor and the odd-numbered stage motor in the even-numbered stage shift mechanism during drive with the engine through the odd-numbered stage shift mechanism, and for regenerating redundant energy with the odd-numbered stage motor and the even-numbered stage motor in the odd-numbered stage shift mechanism during drive with the engine through the even-numbered stage shift mechanism.

14. The twin-clutch type hybrid transmission according to claim 8, characterized by including an emergency start controller for, if the remaining capacity of a battery is at a reference value or lower at the time of start, engaging either the odd-numbered stage mechanical clutch or the even-numbered stage mechanical clutch and driving an engaged one of the odd-numbered stage motor and the even-numbered stage motor to transmit power to the output shaft, and transmitting the power of the engine to a disengaged one of the odd-numbered stage motor and the even-numbered stage motor to charge the battery.

15. The twin-clutch type hybrid transmission according to claim 1, characterized by comprising an external transmission gear train for transmitting the power of the motors of the motor power mechanism, and an actuator for external work connected to the external transmission gear train.

16. A twin-clutch type hybrid transmission, characterized by comprising:
an input shaft to receive power of an engine;
an odd-numbered stage shift mechanism to which rotation of the input shaft is transmitted;
an even-numbered stage shift mechanism to which the rotation of the input shaft is transmitted;
a motor power mechanism for applying power of a motor to at least one of the odd-numbered stage shift mechanism and the even-numbered stage shift mechanism; and
an output mechanism to which power of the odd-numbered stage shift mechanism and power of the even-numbered stage shift mechanism are transmitted, and
characterized in that the odd-numbered stage shift mechanism includes:
an odd-numbered stage transmission gear train for transmitting the rotation of the input shaft;
an odd-numbered stage main clutch for selectively transmitting power of the odd-numbered stage transmission gear train to an odd-numbered stage transmission shaft;
an odd-numbered stage shift gear train provided to the odd-numbered stage transmission shaft, for transmitting rotation to the output mechanism; and
an odd-numbered stage mechanical clutch for selectively engaging the odd-numbered stage shift gear train and the odd-numbered stage transmission shaft,
in that the even-numbered stage shift mechanism includes:
an even-numbered stage transmission gear train for transmitting the rotation of the input shaft;
an even-numbered stage main clutch for selectively transmitting power of the even-numbered stage transmission gear train to an even-numbered stage transmission shaft;
an even-numbered stage shift gear train provided to the even-numbered stage transmission shaft, for transmitting rotation to the output mechanism; and an even-numbered stage mechanical clutch for selectively engaging the even-numbered stage shift gear train and the even-numbered stage transmission shaft, and in that the motor power mechanism includes:
a common synchronization motor;
an odd-numbered stage motor clutch for selectively engaging the common synchronization motor and the odd-numbered stage transmission shaft; and
an even-numbered stage motor clutch for selectively engaging the common synchronization motor and the even-numbered stage transmission shaft.

17. The twin-clutch type hybrid transmission according to claim 16, characterized in that start is made by transmitting the power of the common synchronization motor to the output shaft.

18. The twin-clutch type hybrid transmission according to claim 16, characterized in that the common synchronization motor activates a regenerative brake.

19. The twin-clutch type hybrid transmission according to claim 16, characterized in that the common synchronization motor regenerates the power of the engine.

20. The twin-clutch type hybrid transmission according to claim 16, characterized in that the common synchronization motor is caused to rotate during acceleration with the engine to assist drive.

21. A twin-clutch type hybrid transmission, characterized by comprising:
an input shaft to receive power of an engine;
an odd-numbered stage shift mechanism to which rotation of the input shaft is transmitted;
an even-numbered stage shift mechanism to which the rotation of the input shaft is transmitted;
a motor power mechanism for applying power of a motor to at least one of the odd-numbered stage shift mechanism and the even-numbered stage shift mechanism; and
an output mechanism to which power of the odd-numbered stage shift mechanism and power of the even-numbered stage shift mechanism are transmitted, and
characterized in that the odd-numbered stage shift mechanism includes:
an odd-numbered stage transmission gear train for transmitting the rotation of the input shaft;
an odd-numbered stage main clutch for selectively transmitting power of the odd-numbered stage transmission gear train to an odd-numbered stage transmission shaft;
an odd-numbered stage shift gear train provided to the odd-numbered stage transmission shaft, for transmitting rotation to the output mechanism; and
an odd-numbered stage mechanical clutch for selectively engaging the odd-numbered stage shift gear train and the odd-numbered stage transmission shaft,
in that the even-numbered stage shift mechanism includes:
an even-numbered stage transmission gear train for transmitting the rotation of the input shaft;
an even-numbered stage main clutch for selectively transmitting power of the even-numbered stage transmission gear train to an even-numbered stage transmission shaft;
an even-numbered stage shift gear train provided to the even-numbered stage transmission shaft, for transmitting rotation to the output mechanism; and
an even-numbered stage mechanical clutch for selectively engaging the even-numbered stage shift gear train and the even-numbered stage transmission shaft, and
in that an interstage ratio between adjacent speed stages is set at a substantially constant value.

22. The twin-clutch type hybrid transmission according to claim 21, characterized in that gear ratios of the odd-numbered stage transmission gear train and the even-numbered stage transmission gear train are determined such that a ratio of rotation of the even-numbered stage transmission shaft to rotation of the odd-numbered stage transmission shaft is substantially the same as the interstage ratio.

23. The twin-clutch type hybrid transmission according to claim 22, characterized in that the odd-numbered stage shift gear train and the even-numbered stage shift gear train have substantially the same gear ratio at least between some adjacent ones of shift stages, and that the odd-numbered stage shift gear train and the even-numbered stage shift gear train share a gear of the output mechanism.

24. A twin-clutch type hybrid transmission, characterized by comprising:
an input shaft to receive power of an engine;
an odd-numbered stage shift mechanism to which rotation of the input shaft is transmitted;
an even-numbered stage shift mechanism to which the rotation of the input shaft is transmitted;
a motor power mechanism for applying power of a motor to at least one of the odd-numbered stage shift mechanism and the even-numbered stage shift mechanism;
an output mechanism to which power of the odd-numbered stage shift mechanism and power of the even-numbered stage shift mechanism are transmitted; and
a synchronization shift mechanism for mechanically providing synchronization between the odd-numbered stage shift mechanism and the even-numbered stage shift mechanism during gear shift, and
characterized in that the odd-numbered stage shift mechanism includes:
an odd-numbered stage transmission gear train for transmitting the rotation of the input shaft;
an odd-numbered stage main clutch for selectively transmitting power of the odd-numbered stage transmission gear train to an odd-numbered stage transmission shaft;
an odd-numbered stage shift gear train provided to the odd-numbered stage transmission shaft, for transmitting rotation to the output mechanism; and
an odd-numbered stage mechanical clutch for selectively engaging the odd-numbered stage shift gear train and the odd-numbered stage transmission shaft,
in that the even-numbered stage shift mechanism includes:
an even-numbered stage transmission gear train for transmitting the rotation of the input shaft;
an even-numbered stage main clutch for selectively transmitting power of the even-numbered stage transmission gear train to an even-numbered stage transmission shaft;
an even-numbered stage shift gear train provided to the even-numbered stage transmission shaft, for transmitting rotation to the output mechanism; and
an even-numbered stage mechanical clutch for selectively engaging the even-numbered stage shift gear train and the even-numbered stage transmission shaft,
in that the synchronization shift mechanism includes:
a first synchronization gear train for engaging the odd-numbered stage transmission shaft and the even-numbered stage transmission shaft such that the odd-numbered stage transmission shaft and the even-numbered stage transmission shaft rotate at a first ratio of rotation;
a first synchronization clutch for selecting engagement made by the first synchronization gear train;
a second synchronization gear train for engaging the odd-numbered stage transmission shaft and the even-numbered stage transmission shaft such that the odd-numbered stage transmission shaft and the even-numbered stage transmission shaft rotate at a second ratio of rotation; and a second synchronization clutch for selecting engagement made by the second synchronization gear train, and in that the odd-numbered stage shift mechanism and the even-numbered stage shift mechanism come into synchronization with each other while the first synchronization gear train and the second synchronization gear train are selectively engaged, thereby realizing shift-up or shift-down.

* * * * *